US012020257B2

(12) United States Patent
Laptiev et al.

(10) Patent No.: US 12,020,257 B2
(45) Date of Patent: Jun. 25, 2024

(54) GENERATING A FRAUD PREDICTION UTILIZING A FRAUD-PREDICTION MACHINE-LEARNING MODEL

(71) Applicant: Chime Financial, Inc., San Francisco, CA (US)

(72) Inventors: Anton Laptiev, Vancouver (CA); Jiby Babu, Austin, TX (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 17/545,890

(22) Filed: Dec. 8, 2021

(65) Prior Publication Data

US 2023/0177512 A1 Jun. 8, 2023

(51) Int. Cl.
*G06Q 20/40* (2012.01)
(52) U.S. Cl.
CPC .................... *G06Q 20/4016* (2013.01)
(58) Field of Classification Search
None
See application file for complete search history.

(56) References Cited

U.S. PATENT DOCUMENTS

| 8,290,838 | B1* | 10/2012 | Thakur | G06Q 40/02 |
| | | | | 705/37 |
| 10,872,341 | B1* | 12/2020 | Beckman | G06Q 20/401 |
| 2020/0034842 | A1* | 1/2020 | Ponniah | G06Q 40/03 |
| 2021/0374753 | A1* | 12/2021 | Kramme | G06Q 30/0225 |
| 2021/0374764 | A1* | 12/2021 | Kramme | G06Q 20/409 |
| 2022/0358507 | A1* | 11/2022 | Poduval | G06Q 20/36 |

FOREIGN PATENT DOCUMENTS

| CN | 111738534 B | * | 12/2020 |
| CN | 112529584 A | * | 3/2021 |

\* cited by examiner

*Primary Examiner* — Kirsten S Apple
*Assistant Examiner* — Matthew Cobb
(74) *Attorney, Agent, or Firm* — Keller Preece PLLC

(57) ABSTRACT

This disclosure describes an intelligent fraud detections system that, as part of an inter-network facilitation system, can intelligently generate fraud predictions for digital claims to improve accuracy and efficiency of network-transaction security systems. For example, the disclosed systems can utilize a fraud detection machine-learning model to generate a fraud prediction for a digital claim disputing a digital transaction. Indeed, the disclosed systems can identify features of a digital claim and, based on those features, utilize a fraud detection machine-learning model to generate a fraud prediction for the digital claim. Additionally, based on the fraud prediction, the disclosed systems can perform authorizing, remedial, or other actions with regard to the digital claim.

20 Claims, 13 Drawing Sheets

| Claim # | Transaction | Account | Amount | Recipient | Fraud |
|---|---|---|---|---|---|
| 4321 | Peer-to-Peer | Spending | $50.00 | Fred Adams | High Risk ! |
| 8523 | Unauthorized Transaction | Spending | $30.00 | - | Moderate Risk ● |
| 6002 | Refund Request | Credit | $10.00 | - | Low Risk ✓ |
| ... | ... | ... | ... | ... | ... |

*Fig. 5*

GENERATING A FRAUD PREDICTION UTILIZING A FRAUD-PREDICTION MACHINE-LEARNING MODEL

BACKGROUND

As online transactions have increased in recent years, network-transaction-security systems have increasingly used computational models to detect and protect against cyber fraud, cyber theft, or other network security threats that compromise encrypted or otherwise sensitive information. For example, as such network security risks have increased, existing network-transaction-security systems have employed more sophisticated computing models to detect security risks affecting transactions, account balances, personal identity information, and other information over computer networks that use computing device applications.

With the rise in online transactions, the number of account-take-over events (ATO events), cryptocurrency scams, and other fraudulent schemes are increasing. An ATO event can occur when a digital account is infiltrated or taken control of by an outside computing device or when network credentials are compromised. Among other examples, a cryptocurrency scam can occur when a digital profile or website mimics another profile or business and convinces a user to transfer cryptocurrency in exchange for a promised (but never delivered) product or service. When an ATO event, cryptocurrency scam, or similar event happens, digital accounts often submit claims alleging a network transaction constitutes unauthorized activity or otherwise suggesting an ATO event, cryptocurrency scam, or similar event has occurred. If an ATO or similar event has indeed resulted in an unauthorized network transaction—often as determined by a network-transaction-security system—either the merchant or a finance management system are often responsible for reimbursing the network transaction.

Despite the increase of actual ATO, cryptocurrency scams, or similar events and corresponding claims alleging unauthorized network transactions, many of the claims do not flag actual ATO or similar events but are instead mistaken or fraudulent claims seeking reimbursement or compensation for a network transaction mimicking an ATO or similar event—thereby committing a form of first-party cyber fraud. For instance, a new computing device may log in to a digital account and execute a network transaction with another digital account to fraudulently mimic an ATO event. As another example, a user with authorized access to a digital account may authorize a network transaction without the primary user's knowledge.

To detect first-party-cyber fraud claims falsely alleging an ATO or similar event, existing network-transaction-security systems can use heuristic computing models that identify fraudulent claims based on certain transaction factors. For instance, current systems can follow heuristics that label a claim as fraudulent when a threshold number of risk factors are present, such as identifying a particular transaction type or a particular transaction amount. But the computational models of existing network-transaction-security systems have proven inaccurate and often misidentify false negative claims that are indeed legitimate claims for ATO (or similar) events or false positive claims that are not in fact claims for ATO or similar events.

Under some heuristic computing models, for instance, an existing network-transaction-security system only identifies a claim that fraudulently asserts an unauthorized transaction has occurred after a series of fraudulent claims have been submitted by a digital account or linked digital account. But using a serial dispute record as a heuristic routinely results in a series of cyber fraud. Such a computing model often can detect a fraudulent claim of an ATO event only after failing to detect other fraudulent claims of an ATO or similar event. These, along with additional problems and issues, exist with regard to conventional network-transaction-security systems.

SUMMARY

This disclosure describes embodiments of systems, methods, and non-transitory computer-readable storage media that can solve one or more of the foregoing (or other problems) in the art. In particular, the disclosed systems can utilize a fraud detection machine-learning model to generate a fraud prediction for a digital claim disputing a network transaction. For example, the disclosed systems can identify features of a digital claim and, based on those features, utilize a fraud detection machine-learning model to generate a fraud prediction for the digital claim. The systems can then provide a visual indicator of the fraud prediction for display in a graphical user interface. Based on the fraud prediction, the disclosed systems can also perform an authorizing, remedial, or other action with regard to the digital claim, such as by suspending an account or a network transaction associated with the digital claim or by providing a credit to the account associated with the network transaction.

By utilizing a fraud detection machine-learning model to generate a fraud prediction for a digital claim, the disclosed systems can improve the accuracy of detecting or predicting fraudulent digital claims disputing network transactions over existing network-transaction-security systems. As described further below, for instance, the disclosed systems use a machine-learning model that improves the speed and computing efficiency of detecting fraudulent digital claims over existing network-transaction-security systems. In some cases, such a machine-learning model can find patterns that existing network-transaction-security systems cannot detect.

BRIEF DESCRIPTION OF THE DRAWINGS

The detailed description provides one or more embodiments with additional specificity and detail through the use of the accompanying drawings, as briefly described below.

FIG. 5 illustrates an example graphical user interface including fraud prediction notifications in accordance with one or more embodiments.

DETAILED DESCRIPTION

Figure 1:
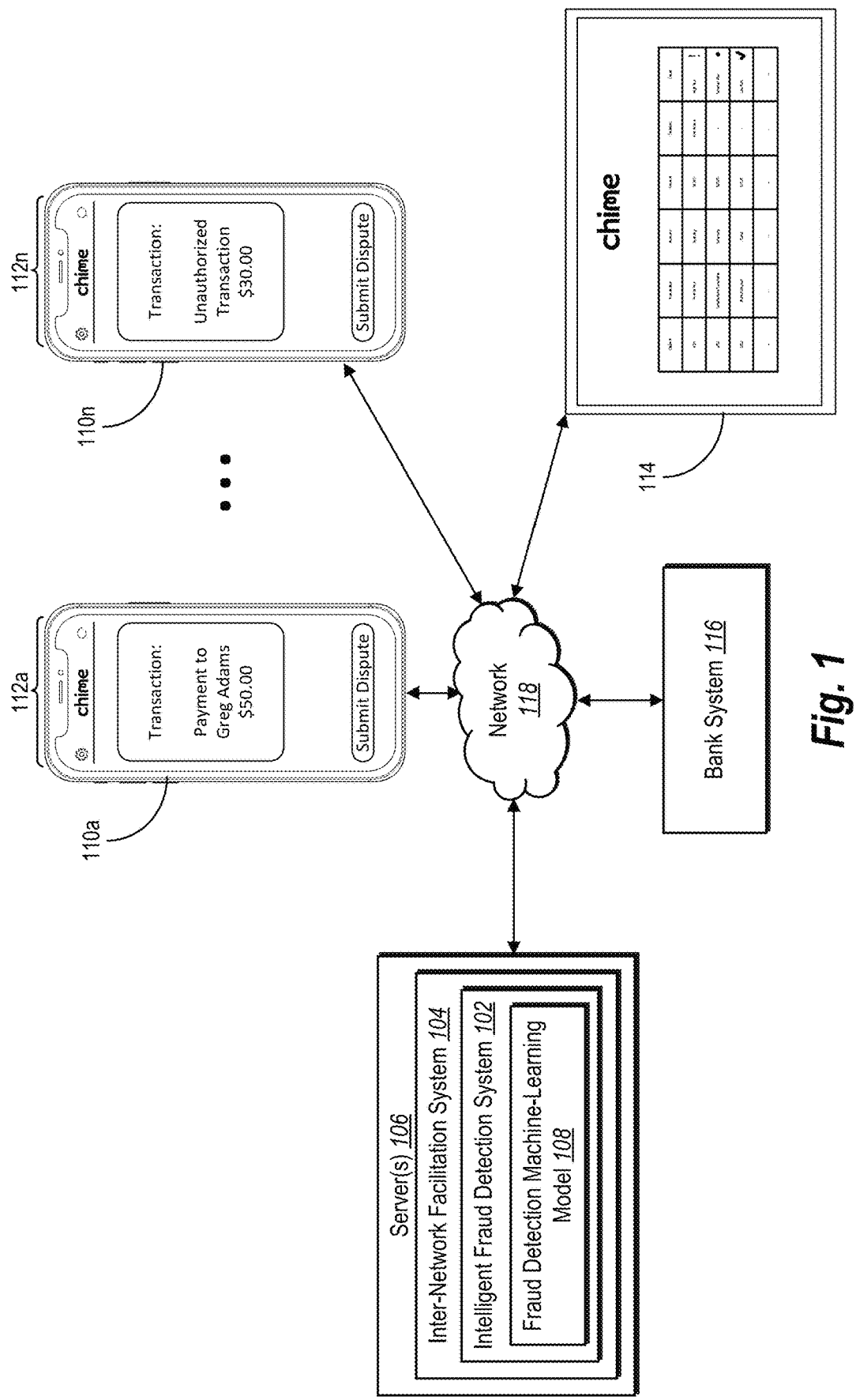
FIG. 1 illustrates a block diagram of an environment in which an intelligent fraud detection system operates in accordance with one or more embodiments.

This disclosure describes embodiments of an intelligent fraud detection system that utilizes a machine-learning model to generate a fraud prediction for a digital claim disputing a network transaction. For instance, the intelligent fraud detection system can analyze a digital claim to identify features of the claim. Based on the features identified for the digital claim, the intelligent fraud detection system can utilize a fraud detection machine-learning model to generate a fraud prediction for the digital claim, such as a fraud score or fraud classification. The intelligent fraud detection system can then provide a visual indicator of the fraud prediction for display in a graphical user interface (e.g., an administrator device) as well as execute additional actions based on the fraud prediction.

As indicated above, the intelligent fraud detection system can identify features of a digital claim disputing a network transaction by determining features of a digital claim from among various feature groups. Such identified or detected features can come from groups of features for a transaction associated with the digital claim (e.g., a peer-to-peer transaction or a merchant purchase), an account associated with the digital claim, or a computing device, among other feature groups. Feature groups can include related individual features, such as a zip code feature, a merchant category code feature, an account dormancy time feature, a sign-in feature, or a transaction-number feature.

Based on the identified or detected features, the intelligent fraud detection system can then utilize a fraud detection machine-learning model in determining the fraud prediction. The fraud detection machine-learning model is trained on features for previous digital claims with labels identifying the claims as fraudulent or legitimate. As explained further below, the fraud detection machine-learning model can take various forms, including, for example, a gradient boosted decision tree (e.g., XG boost) or a neural network.

As noted above, in some cases, the intelligent fraud detection system can provide notifications or other visual indicators of a fraud prediction and execute various authorizing or remedial actions based on the fraud prediction. For instance, the intelligent fraud detection system can determine that the fraud prediction exceeds a high-risk fraud prediction threshold, indicating a high probability that the digital claim is fraudulent. The intelligent fraud detection system can then provide a high-risk visual indicator for display, denoting a high likelihood of fraud for the digital claim. Based on the fraud prediction exceeding the high-risk fraud prediction threshold, the intelligent fraud detection system can suspend one or both of a network transaction associated and an account associated with the digital claim. If the intelligent fraud detection system suspends an account associated with the digital claim, the intelligent fraud detection system can also identify additional digital claims associated with the suspended account (e.g., pending claims). The intelligent fraud detection system can accordingly provide an additional visual indicator for display, denoting potential fraud for additional digital claims associated with the suspended account.

The intelligent fraud detection system may also determine that the fraud prediction satisfies a moderate-risk fraud prediction threshold, indicating a moderate probability that the digital claim is fraudulent or contains fraudulent activity. The intelligent fraud detection system can then provide a moderate-risk visual indicator for display, denoting a moderate risk of fraud for the digital claim. Based on the fraud prediction for a digital satisfying a moderate-risk fraud prediction threshold, the intelligent fraud detection system can execute other related actions, such as identifying and generating fraud predictions for other claims associated with a same transaction-initiating account or transaction-recipient account.

Beyond determining that the digital claim exceeds high-risk or moderate-risk fraud prediction thresholds, in other embodiments, the intelligent fraud detection system may also determine whether a fraud prediction satisfies a low-risk fraud prediction threshold. When the fraud prediction does not satisfy (e.g., is lower than) the low-risk fraud prediction threshold, the intelligent fraud prediction system can provide a low-risk visual indicator for display, denoting a low risk of fraud for the digital claim. Based on the fraud prediction not satisfying the low-risk fraud prediction threshold, the intelligent fraud prediction system can also issue a credit (e.g., provisional credit) to an account associated with the network transaction, indicating the low probability that the digital claim is fraudulent.

In addition to determining a fraud prediction for a digital claim, the intelligent fraud detection system can identify additional digital claims submitted by an account associated with the digital claims and generate an aggregate fraud prediction for multiple claims from an account. More specifically, in one or more embodiments, the intelligent fraud prediction system can identify that an account associated with the digital claim also submitted an additional digital claim disputing another network transaction. Based on identified features of both the digital claim and the additional digital claim, the fraud detection machine-learning model can generate an aggregate fraud prediction.

In addition to disputing a single network transaction, the intelligent fraud detection system can identify that a digital claim disputes an additional network transaction (e.g., another peer-to-peer transaction or purchase) and generate a fraud prediction for the digital claim disputing multiple network transactions. In particular, in one or more embodiments, the intelligent fraud detection system can identify features associated with the digital claim disputing both the originally received network transaction and the additional network transaction to generate the fraud prediction.

The intelligent fraud detection system provides several technical advantages over existing network-transaction-security systems. For example, in some cases, the intelligent fraud detection system uses a machine-learning model that generates more accurate fraud predictions for digital claims disputing network transactions than existing network-transaction-security systems. By using a unique combination of features and feature groups associated with digital claims disputing networking transactions, the intelligent fraud detection system trains (or uses a trained version of) a fraud detection machine-learning model to generate finely-tuned predictions of whether such digital claims fraudulently dispute corresponding networking transactions. In some cases, the intelligent fraud detection system identifies (and uses) digital-claim features that have proven better indicators than others in accurately predicting whether a digital claim is fraudulent or legitimate.

Indeed, in some embodiments, the disclosed fraud detection machine-learning model processes features associated with a digital claim disputing a network transaction and generates a fraud prediction for the digital claim itself, rather than simply processing features associated with the network transaction and generating a fraud prediction for the network transaction. Because some of the features associated with the digital claim and account for the digital claim—such as average fraud rates for the zip code of the digital-claim submitting account and number of transactions for that same account—generate more accurate fraud predictions and can be highly important or weighted variables, the intelligent fraud detection system produces unexpectedly better results by using features associated with the digital claim rather than merely features associated with a single network transaction. As described further below, the fraud detection machine-learning model exhibits a lower false-positive rate and a higher true positive rate than existing network-transaction-security systems using a heuristic computational model.

In part because of the improved accuracy of fraudulent predictions, in some cases, the intelligent fraud detection system uses a machine-learning model that improves the speed and computing efficiency of detecting fraudulent digital claims over existing network-transaction-security systems. As suggested above, some existing network-transaction-security systems use a heuristic computing model that identifies claims that fraudulently assert an unauthorized transaction has occurred only after a series of fraudulent claims have been submitted by a digital account or linked digital account based on thresholds for a cumulative amount and number of claims. In such cases, the existing network-transaction-security systems must inefficiently use memory and processing to track and process an entire series of claims, sometimes requiring a re-run of the heuristic model on claims from a digital account as new claims from the same digital account are submitted. By contrast, the intelligent fraud detection system can detect fraudulent claims initially submitted from a digital account rather than a fraudulent claim after a series of fraudulent claims detected by a heuristic computational model. Rather than inefficiently run and re-run a heuristic computational model for claims from a same or similar digital account, the intelligent fraud detection system can detect first-time-fraudulent claims and thereby preserve computing resources inefficiently expended by current computational models.

As noted above, some existing network-transaction-security systems cannot accurately detect fraudulent activity among seemingly similar digital claims. By contrast, the intelligent fraud detection system can accurately detect fraudulent digital claims even among digital claims that appear similar or exhibit overlapping features common to some fraudulent and some legitimate digital claims disputing an authorization of a network transaction. Such overlapping features often result in false-negative and false-positive predictions of fraudulent claims. By using a unique combination of features and feature groups associated with digital claims disputing network transactions, the intelligent fraud detection system can detect patterns other network-transaction-security systems fail to observe. By utilizing a trained version of the fraud prediction machine-learning model with improved fraud prediction accuracy, the intelligent fraud detection system can also detect and provide fraud predictions for digital claims without generating (or with much less risk of generating) false positive or false negative predictions.

As illustrated by the foregoing discussion, the present disclosure utilizes a variety of terms to describe features and benefits of the intelligent fraud detection system. Additional detail is now provided regarding the meaning of these terms. As used herein, the term "machine-learning model" refers to a computer algorithm or a collection of computer algorithms that automatically improve for a particular task through experience based on the use of data. For example, a machine-learning model can utilize one or more learning techniques to improve accuracy and/or effectiveness. Example machine-learning models include various types of decision trees, support vector machines, Bayesian networks, or neural networks.

As mentioned, in some embodiments, the fraud detection machine-learning model can be a neural network. The term "neural network" refers to a machine-learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, a self-attention transformer neural network, or a generative adversarial neural network.

In some cases, the machine-learning model comprises a fraud detection machine-learning model. As used herein, the term "fraud detection machine-learning model" refers to a machine-learning model trained or used to detect fraudulent digital claims disputing network transactions. In some cases, the fraud detection machine-learning model refers to a trained machine-learning model that generates a fraud score or fraud classification for a digital claim disputing an authenticity, authorization, control, or other legitimacy of one or more network transactions. For example, the fraud detection machine-learning can utilize a series of gradient boosted decision trees (e.g., XGBoost algorithm), while in other cases, the fraud detection machine-learning model is a random forest model, a multilayer perceptron, a linear regression, a support vector machine, a deep tabular learning architecture, a deep learning transformer (e.g., self-attention-based-tabular transformer), or a logistic regression.

As noted above, the digital claim can be a submission that disputes an authenticity or authorization of a network transaction. As used herein, the term "network transaction" refers to a transaction performed as part of an exchange of tokens, currency, or data between accounts or other connections of the system. In some embodiments, the network transaction can be a peer-to-peer transaction that transfers currency, non-fungible tokens, digital credentials, or other digital content between accounts. In some embodiments, the network transaction may be a transaction with a merchant (e.g., a purchase transaction).

As further used herein, the term "digital claim" refers to a claim submitted by an account that disputes or otherwise indicates an issue with a network transaction. For instance, a digital claim can include a claim disputing an authenticity, authorization, control, or other legitimacy of a network transaction. The digital claim may be submitted to an administrator account and denoting that there is an issue with a network transaction. For example, the digital claim could claim that a network transaction was not authorized (e.g., that an ATO occurred).

Additionally, as used herein, the term "fraud prediction" refers to a classification or metric indicating whether a claim disputing one or more network transactions is fraudulent. In some embodiments, a fraud prediction comprises a value indicating a likelihood that a digital claim is inauthentic, unauthorized, outside of the account holder's control, or otherwise lacks legitimacy. For example, a fraud prediction can comprise a score (e.g., a number, a fraction, or other numerical indicators) indicating a degree to which a fraud detection machine-learning model predicts a digital claim is fraudulent. In other embodiments, the fraud indicator could be a classifier, such as a "0" or a "1" or a "yes" or "no," indicating that the digital claim is or is not fraudulent.

As used herein, the term "visual indicator" refers to a representation in a graphical user interface that visually shows various different fraud risk levels. For instance, the visual indicator could be a high-risk visual indicator, a moderate-risk visual indicator, or a low-risk visual indicator. A high-risk visual indicator refers to a visual indicator that denotes a high risk of fraud for the digital claim. A moderate-risk visual indicator refers to a visual indicator that denotes a moderate risk of fraud for the digital claim. A low-risk visual indicator refers to a visual indicator that denotes a low risk of fraud for the digital claim. Additionally, the visual indicator can be a visual fraud propensity indicator, denoting that there is a likelihood of fraud for an additional account associated with a network transaction or digital claim. In some embodiments, the visual indicator could show up in the graphical user interface as an image or other graphical representation of the fraud prediction for the digital claim. In other embodiments, the visual indicator could be a pop-up notification in the graphical user interface. Additionally, in other embodiments, the intelligent fraud detection system can update a graphical user interface to denote the risk of fraud (e.g., by changing the color of a cell).

As used herein, the term "fraud prediction threshold" refers to a level or threshold for a fraud prediction at which a likelihood or probability of fraud is detected. For example, the fraud prediction threshold could be a "high-risk fraud prediction threshold," denoting a high probability of fraud. In some embodiments, the high-risk fraud prediction threshold could be when the fraud prediction constitutes a fraud score or classification above a certain number or percentage (e.g., above 0.65). In other embodiments, the high-risk fraud prediction threshold could be when a decision tree answers with a "yes" to questions regarding whether there is a high risk of fraud. Additionally, the fraud prediction threshold could be a "moderate-risk fraud prediction threshold," indicating that there is a moderate probability of fraud. In some embodiments, the moderate risk fraud threshold could be when the fraud prediction constitutes a fraud score or classification above a certain number or percentage but below a certain number or percentage for high risk (e.g., above 0.34 but below 0.65). In other embodiments, the moderate-risk fraud prediction threshold could be when a decision tree answers with a yes to questions regarding whether there is a moderate risk of fraud. In addition, the fraud prediction threshold could be a "low-risk fraud prediction threshold," indicating a low probability of fraud. For example, in some embodiments, the low-risk fraud threshold could be when the fraud prediction constitutes a fraud score or classification below a certain number or percentage (e.g., below 0.34). In other embodiments, the low-risk fraud prediction threshold could be when a decision tree answers with a no to questions regarding whether there is a risk of fraud or yes to questions regarding whether there is a low risk of fraud.

As noted, in some embodiments, the intelligent fraud detection system utilizes the fraud detection machine-learning model to generate an aggregate fraud prediction. As used herein, the term "aggregate fraud prediction" refers to a fraud prediction that is generated based on two or more digital claims. An aggregated fraud score can indicate fraud for the two or more digital claims or fraudulent activity by an account associated with the two or more digital claims. Accordingly, in some cases, the aggregate fraud prediction may be generated by the fraud prediction machine learning model based on features in the two or more digital claims. In other embodiments, the aggregate fraud prediction could be an average of individual fraud predictions for each claim.

In some embodiments, the intelligent fraud detection system can generate a fraud-propensity label. As used herein, the term "fraud-propensity label" denotes a label or other identifier attached to an account that indicates a probability of fraud for an account based on a likelihood of fraud for an associated account. As such, in some cases, the account can be a transaction-initiating account, a transaction-receiving account, or other account associated with the account wherein there is a likelihood of fraudulent activity (e.g., an account associated with a digital claim where a fraud prediction satisfied a high-risk fraud prediction threshold or a moderate-risk fraud prediction threshold).

Additional detail regarding the intelligent fraud detection system will now be provided with reference to the figures. In particular, FIG. 1 illustrates a block diagram of a system environment for implementing an intelligent fraud detection system 102 in accordance with one or more embodiments. As shown in FIG. 1, the environment includes server(s) 106 housing the intelligent fraud detection system 102 as part of an inter-network facilitation system 104. The intelligent fraud detection system 102 further houses the fraud detection machine-learning model 108. The environment of FIG. 1 further includes client device(s) 110*a*-110*n*, an administrator device 114, and a bank system 116. The server(s) 106 can include one or more computing devices to implement the intelligent fraud detection system 102. Additional description regarding the illustrated computing devices (e.g., the server(s) 106, the client device(s) 110*a*-110*n*, the administrator device 114, the bank system 116, and the network 118) is provided with respect to FIGS. 11-12 below.

As shown, the intelligent fraud detection system 102 utilizes a network 118 to communicate with the client device(s) 110*a*-110*n*, the administrator device 114, and/or the bank system 116. The network 118 may comprise any network described in FIGS. 11-12. For example, the intelligent fraud detection system 102 communicates with the client device(s) 110*a*-110*n* and/or the bank system to provide and receive information pertaining to digital claims and/or network transactions. Indeed, the inter-network facilitation system 104 or the intelligent fraud detection system 102 can receive a digital claim disputing a network transaction from one or more client device(s) 110a-110n. In response, the intelligent fraud detection system 102 can utilize the fraud detection machine-learning model 108 to generate a fraud prediction for the digital claim and provide a visual indicator of the fraud prediction to the administrator device 114.

To generate a fraud prediction, in some embodiments, the inter-network facilitation system 104 or the intelligent fraud detection system 102 communicates with the client device(s) 110a-110n and/or the bank system 116. More specifically, the inter-network facilitation system 104 or the intelligent fraud detection system 102 identifies one or more features of a digital claim by communicating with the client device(s) 110a-110n and/or the bank system 116. For example, the inter-network facilitation system 104 or the intelligent fraud detection system 102 accesses the client device(s) 110a-110n and/or the bank system 116 to identify features associated with the digital claim disputing one or more network transactions.

In one or more embodiments, the inter-network facilitation system 104 or the intelligent fraud detection system 102 further communicates with the client device(s) 110a-110(n) to identify accounts associated with the digital claim. More specifically, the inter-network facilitation system 104 or the intelligent fraud detection system 102 can communicate with the client device(s) 110a-110(n) to identify that an account associated with the digital claim is associated with the client device(s) 110a-110n. In addition, the inter-network facilitation system 104 can communicate with the client device(s) 110a-110n to determine that more than one client device is associated with an account that submitted a digital claim. For example, the inter-network facilitation system 104 or the intelligent fraud detection system 102 can determine that a digital claim is associated with an account that is associated with two or more client devices.

As indicated by FIG. 1, the client devices 110a-110n respectively include client applications 112a-112n. In many embodiments, the inter-network facilitation system 104 or the intelligent fraud detection system 102 communicates with the client device(s) 110a-110n to, for example, receive and provide information including an account associated with the client device(s) 110a-110n, digital claim features, device features, account features, and network transaction features. As shown, the intelligent fraud detection system 102 receives a digital claim from the client devices 110a-110n through the client applications 112a-112n, respectively.

In some cases, the inter-network facilitation system 104 or the intelligent fraud detection system 102 further communicates with the client device(s) 110a-110n to suspend an account associated with the digital claim. In particular, the inter-network facilitation system 104 or the intelligent fraud detection system 102 can determine that a fraud prediction generated by the fraud detection machine-learning model satisfies (e.g., exceeds) a high-risk fraud prediction threshold and communicates with the client device(s) 110a-110n to suspend an account associated with the digital claim. For example, the inter-network facilitation system 104 or the intelligent fraud detection system 102 communicates with the client device(s) 110a-110n (e.g., via the client applications 112a-112n) to stop all activity with the inter-network facilitation system (e.g., not submit any more disputes or not make any network transactions).

In some embodiments, the inter-network facilitation system 104 or the intelligent fraud detection system 102 further communicates with the client device(s) 110a-110n and/or the bank system 116 to identify network transactions associated with a digital claim submitted by an account associated with the client device(s) 110a-110n. In particular, the inter-network facilitation system 104 or the intelligent fraud detection system can determine the type of network transaction (e.g., peer-to-peer transaction, transfer, account credit, or ATM withdrawal) associated with the digital claim. In addition, the inter-network facilitation system 104 or the intelligent fraud detection system 102 can determine that the digital claim disputes an additional network transaction. For example, the inter-network facilitation system 104 or the intelligent fraud detection system 102 can determine that a single digital claim submitted by a client device(s) 110a-110n disputes more than one network transaction.

As previously mentioned, the inter-network facilitation system 104 or the intelligent fraud detection system 102 can provide (and/or cause the administrator device 114 to display or render) visual elements within a graphical user interface associated with the administrator device 114. For example, the inter-network facilitation system 104 or the intelligent fraud detection system 102 can provide a graphical user interface that includes a visual indicator of the fraud prediction. Within the visual indicator of the fraud prediction, the intelligent fraud detection system can present and update a fraud prediction for a digital claim (e.g., by displaying an image, value, or changing the color of a cell).

Although FIG. 1 illustrates the environment having a particular number and arrangement of components associated with the intelligent fraud detection system 102, in some embodiments, the environment may include more or fewer components with varying configurations. For example, in some embodiments, the inter-network facilitation system 104 or the intelligent fraud detection system 102 can communicate directly with the client device(s) 110a-110n, the bank system 116, or the administrator device 114, bypassing the network 118. In these or other embodiments, the inter-network facilitation system 104 or the intelligent fraud detection system 102 can be housed (entirely on in part) on the client device(s) 110a-110n. Additionally, the inter-network facilitation system 104 or the intelligent fraud detection system 102 can include or communicate with a database for storing information, such as account information or network transaction information.

Figure 2:
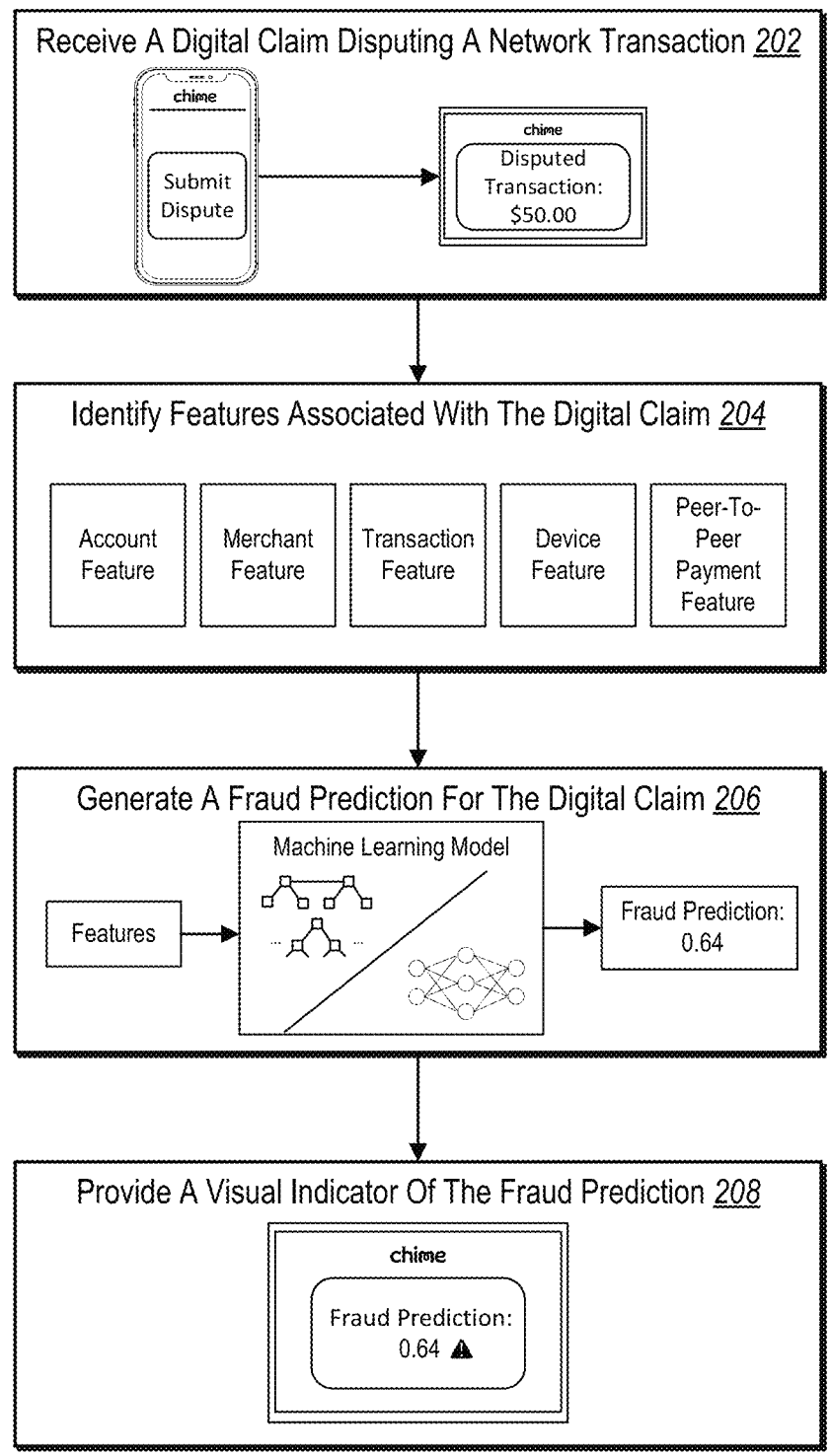
FIG. 2 illustrates an example sequence flow for the intelligent fraud detection system generating a fraud prediction in accordance with one or more embodiments.

As previously mentioned, the intelligent fraud detection system 102 can generate a fraud prediction for a digital claim. FIG. 2 illustrates an overview of the intelligent fraud detection system 102 utilizing a fraud detection machine-learning model to generate a fraud prediction for a digital claim in accordance with one or more embodiments. Thereafter, the description of subsequent figures provides additional detail regarding specific acts or components of the intelligent fraud detection system 102.

As illustrated in FIG. 2, the intelligent fraud detection system 102 performs an act 202 of receiving a digital claim disputing a network transaction. In particular, the intelligent fraud detection system 102 receives a digital claim from a client device (e.g., the client device(s) 110a-110n) that disputes a network transaction. For example, a digital claim could dispute the authenticity, authorization, control, or other legitimacy of a network transaction (e.g., a peer-to-peer transaction or transaction with a merchant). In some cases, the digital claim asserts that a transfer was unauthorized or not initiated by a digital account (e.g., within the inter-network facilitation system 104), an external transfer or other transaction was unauthorized, an account credit was not posted, or ATM cash not received. Furthermore, a digital claim can dispute multiple transactions, including different transaction types. As shown, the intelligent fraud detection system 102 receives a digital claim disputing a $50 network transaction.

As further illustrated in FIG. 2, the intelligent fraud detection system 102 performs an act 204 to identify features associated with the digital claim. In particular, the intelligent fraud detection system 102 determines or identifies features from among various feature groups. Feature groups can include, but are not limited to, an account feature, a merchant feature, a transaction feature, a device feature, or a peer-to-peer payment feature. In addition, feature groups can include individual features associated with the network transaction, client device, or account, among other things.

As further shown in FIG. 2, the intelligent fraud detection system 102 performs an act 206 to generate a fraud prediction for the digital claim. More specifically, the intelligent fraud detection system 102 generates a fraud prediction by utilizing a fraud detection machine-learning model (e.g., the fraud detection machine-learning model 108). For example, the intelligent fraud detection system 102 utilizes the fraud prediction machine-learning model to process or analyze one or more features associated with the digital claim to generate a fraud prediction. As shown, the fraud prediction machine-learning model can be a series of gradient boosted decision trees (e.g., XGBoost algorithm), a neural network, or other machine-learning model.

To elaborate, the fraud prediction shows how likely it is that the digital claim is a fraudulent transaction misrepresenting the nature of the network transaction as unauthorized or fraudulent. The fraud prediction can be a score (e.g., 0.64) or a classifier (e.g., a "0" or "1" or a "yes" or "no") indicating that the digital claim is or is not fraudulent. As shown, the fraud prediction is a score of 0.64. Based on the fraud prediction satisfying certain thresholds, the intelligent fraud detection system 102 can take further actions on the digital claim. For example, the intelligent fraud detection system 102 can determine that the fraud prediction satisfies a high-risk fraud prediction threshold, a moderate-risk fraud prediction threshold, or a low-risk fraud prediction threshold, as explained further below.

As further illustrated in FIG. 2, the intelligent fraud detection system 102 performs an act 208 to provide a visual indicator of the fraud prediction. In particular, in certain cases, the visual indicator is an indication of various risk levels. In some embodiments, the intelligent fraud detection system 102 provides a visual indicator in the form of a score, a number, a percentage, or a yes/no. In other embodiments, the intelligent fraud prediction system provides a visual indicator in the form of an image or other graphical indication. As shown, the intelligent fraud detection system 102 provides a fraud prediction as a number 0.64 along with an image representing a high-risk fraud prediction.

Figure 3:
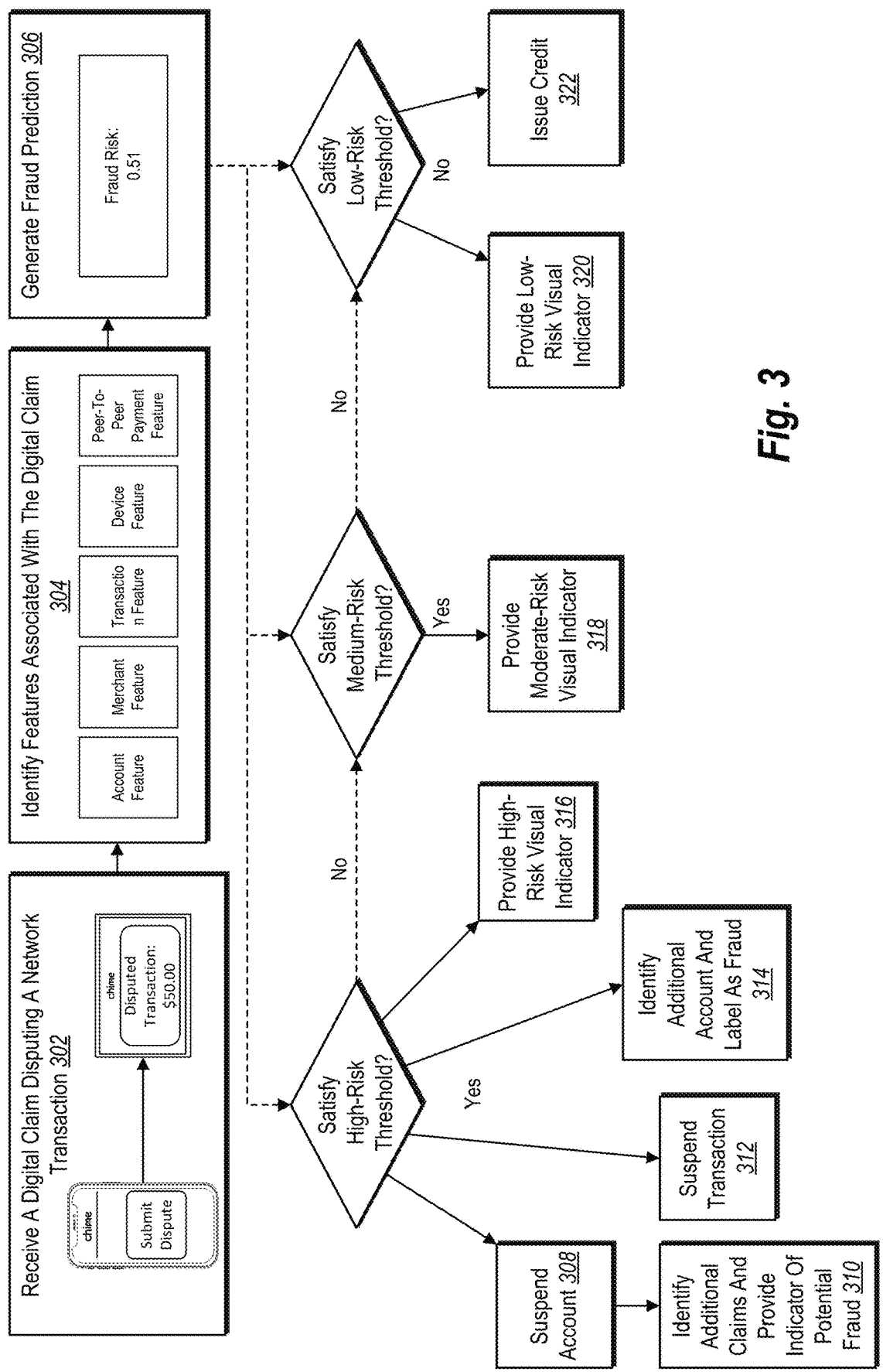
FIG. 3 illustrates an example sequence flow for the intelligent fraud detection system determining actions based on a fraud prediction in accordance with one or more embodiments.

In certain embodiments, the intelligent fraud detection system 102 can determine that the fraud prediction satisfies certain thresholds. Based on the fraud prediction meeting a particular threshold, the intelligent fraud detection system 102 can execute an authorizing, remedial, or other action. FIG. 3 illustrates an example sequence flow for determining such actions based on a fraud prediction score.

As illustrated in FIG. 3, the intelligent fraud detection system 102 performs an act 302 of receiving a digital claim disputing from a client device (e.g., the client device(s) 110a-110n) that disputes a network transaction. For example, a digital claim could dispute the authenticity, authorization, control, or other legitimacy of a network transaction. In some cases, the digital claim may dispute that an owner or user of a digital account did not authorize the network transaction (e.g., they did not initiate or approve the transaction). In other cases, the digital claim may assert that an ATO event occurred. The network transaction could be one of many kinds of transactions, such as a peer-to-peer transaction or a transaction with a merchant (e.g., a purchase transaction).

As further illustrated in FIG. 3, the intelligent fraud detection system 102 performs an act 304 of identifying features associated with the digital claim. In particular, the intelligent fraud detection system 102 can determine features associated with the digital claim by identifying features from among various feature groups or by identifying individual features. Feature groups can include, but are not limited to, features associated with an account submitting the digital claim (e.g., an account feature), a merchant associated with the digital claim (e.g., a merchant feature), a network transaction associated with the digital claim (e.g., a transaction feature), a device associated with the digital claim (e.g., a device feature), or a peer-to-peer payment associated with the digital claim (e.g., a peer-to-peer feature). Identifying individual features may include identifying individual features within the feature groups, such as a zip code feature, a merchant category code feature, an account dormancy time feature, a sign-in feature, or a transaction-number feature. More detail with regard to the feature groups and individual features will be discussed in relation to FIGS. 4A and 6.

As additionally illustrated in FIG. 3, the intelligent fraud detection system 102 performs an act 306 of generating a fraud prediction. In particular, the intelligent fraud detection system 102 generates a fraud prediction by utilizing a fraud prediction machine-learning model (e.g., the fraud detection machine-learning model 108). For example, the fraud prediction machine-learning model can be a series of gradient boosted decision trees (e.g., XGBoost algorithm) or a neural network. As explained below with respect to FIG. 4B, the intelligent fraud detection system 102 uses training features associated with training digital claims—along with fraud action labels for the training digital claims—to train the fraud detection machine-learning model to produce accurate fraud predictions. More detail with regard to training the fraud prediction machine-learning model will be discussed in relation to FIGS. 4A-4B.

The intelligent fraud detection system 102 can also utilize the fraud detection machine-learning model to generate fraud predictions based on multiple network transactions. Specifically, the intelligent fraud detection system 102 can determine that a digital claim disputes multiple network transactions and identify features based on the multiple network transactions. Further, the intelligent fraud detection system 102 may generate a fraud prediction for such a digital claim. For example, the fraud prediction can be generated by the fraud prediction machine-learning model based on the features of the digital claim disputing multiple network transactions.

Further, the intelligent fraud detection system 102 can generate an aggregate fraud prediction based on multiple digital claims from or associated with a single digital account. Specifically, the intelligent fraud detection system 102 can identify an account (e.g., a same transaction-initiating account or a transaction-recipient account) associated with a digital claim and identify additional digital claims associated with the account. Further, the intelligent fraud detection system 102 can identify features associated with the digital claim and any additional digital claims associated with the account and, based on the identified features, can generate an aggregated fraud prediction based on the digital claim and the additional digital claim(s). For example, the intelligent fraud detection system 102 can generate the aggregate fraud prediction by generating a single fraud prediction based on the features of both the digital claim and the additional digital claim(s). In other embodiments, the intelligent fraud detection system 102 can generate the aggregate fraud prediction by taking the average of individual fraud predictions for the digital claim and the additional digital claim(s).

As previously mentioned, the intelligent fraud detection system 102 can execute various actions based on the fraud prediction. As shown in FIG. 3, the intelligent fraud detection system determines if the fraud prediction satisfies (e.g., exceeds) a high-risk fraud prediction threshold or a moderate-risk fraud prediction threshold, or if the fraud prediction does not satisfy (e.g., is lower than) a low-risk fraud prediction threshold. For example, if the fraud prediction satisfies a high-risk fraud prediction threshold, the intelligent fraud detection system 102 can perform an act 308 of suspending an account associated with the digital claim. Specifically, the intelligent fraud detection system 102 can identify an account associated with the digital claim (e.g., an account that submitted the digital claim) and suspend the account. For example, the intelligent fraud detection system 102 could disable the account or disable certain tools or features of the account at the inter-network facilitation system 104 (e.g., by prohibiting further network transactions indefinitely or for a threshold time period). Additionally, the intelligent fraud detection system 102 can disable access to an application of the inter-network facilitation system 104.

After suspending an account associated with the digital claim, the intelligent fraud detection system 102 can also perform an act 310 of identifying additional claims associated with the suspended account and providing an indicator of potential fraud. For example, the intelligent fraud detection system 102 can determine that the suspended account is associated with one or more additional digital claims (e.g., in addition to the digital claim that exceeded the high-risk fraud prediction threshold). Additional digital claims can comprise pending digital claims, that is, those claims submitted by the suspended account that have not yet completed processing in. Once additional digital claim(s) are detected, the intelligent fraud detection system 102 can provide an indicator of potential fraud, denoting a probability that the additional digital claim(s) are fraudulent.

For example, the intelligent fraud detection system 102 can provide an indicator of potential fraud by providing a visual indicator to a graphical user interface of an administrator device of the inter-network facilitation system (e.g., administrator device 114). The indicator of potential fraud could be an image or other pictorial representation that denotes the potential for fraud. In addition, the indicator of potential fraud could be represented by a score or other numerical indication that the additional digital claims have a probability of fraud. Additionally, the indicator of potential fraud could be denoted by a change in color in the graphical user interface (e.g., changing the color in a cell of the graphical user interface).

In addition to suspending an account, if a fraud prediction exceeds a high-risk fraud prediction threshold, the intelligent fraud detection system 102 can also perform act 312 of suspending a network transaction associated with the digital claim. For example, the intelligent fraud detection system 102 can suspend a network transaction disputed in a digital claim. Specifically, the intelligent fraud detection system 102 can stop a transaction within the inter-network facilitation system 104 or other systems to stop a network transaction. For example, in some embodiments, the network transaction can be conducted within the inter-network facilitation system 104 (e.g., a peer-to-peer transaction or other transaction between accounts of the inter-network facilitation system), and the inter-network facilitation system 104 can send a data request to stop the payment within the system. In other embodiments, the network transaction is conducted through an external computing system (e.g., the bank system 116), and the intelligent fraud detection system 102 can send instructions to the external computing system to stop the network transaction (e.g., to stop payment or cancel a purchase).

In some embodiments, if the fraud prediction satisfies (e.g., exceeds) a high-risk fraud prediction threshold, the intelligent fraud detection system 102 can perform act 314 to identify an additional account and label additional account as fraud. Specifically, the intelligent fraud detection system 102 can identify a first account that submitted a digital claim, where the fraud prediction machine-learning model generates a fraud prediction for the digital claim that satisfies (e.g., exceeds) a high-risk fraud prediction threshold. The intelligent fraud detection system 102 can identify a second account associated with the first digital account and generate a fraud-propensity label for the second account, thereby identifying the second account as potentially fraudulent or otherwise compromised. For example, in some cases, the first and second accounts may be associated with a network transaction of the digital claim, such as a transaction-initiating account or transaction-recipient account. Additionally, the first account and the second account can be related through device features or characteristics, such as through a shared device ID. Furthermore, the first account and second account can be associated through account features or characteristics, such as identification features or identification verification features.

Once the intelligent fraud detection system 102 determines that the fraud prediction satisfies a high-risk fraud prediction threshold, the intelligent fraud detection system 102 can perform act 316 to provide a high-risk visual indicator, which can indicate a high probability of fraud for a digital claim. For example, the intelligent fraud detection system 102 can provide a high-risk visual indicator by providing a graphic for display within a graphical user interface. For example, the intelligent fraud detection system 102 can provide the high-risk visual indicator in the form of an exclamation-mark icon, a warning-sign icon, a siren icon, a stop-sign icon, a traffic-light icon, or other suitable graphical icon indicating a high risk of fraud—optionally along with a particular color as a color-coded graphic (e.g. a red-coded graphic). Additionally, or alternatively, the intelligent fraud detection system 102 can provide the high-risk visual indicator in the form of text (e.g., "High Risk") with or without color coding (e.g., red text).

As shown in FIG. 3, if the fraud prediction does not satisfy a high-risk fraud prediction threshold, the intelligent fraud detection system 102 can determine whether the fraud prediction satisfies (e.g., exceeds) a moderate-risk fraud prediction threshold and execute other related actions. For example, the intelligent fraud detection system 102 can perform an act 318 and provide a moderate-risk visual indicator denoting there is a moderate probability of fraud for the digital claim. In some embodiments, the intelligent fraud detection system 102 can provide a moderate-risk visual indicator in the form of a gauge icon with a pointer pointing to a moderate risk of fraud among different risk levels, a circular gauge with a colored ring indicating a moderate risk of fraud, a traffic-light icon, or other suitable graphical icon indicating a moderate risk of fraud—optionally along with a particular color as a color-coded graphic (e.g. a yellow-coded graphic). Additionally, or alternatively, the intelligent fraud detection system 102 can provide the moderate-risk visual indicator in the form of text (e.g., "Moderate Risk") with or without color coding (e.g., yellow text).

In addition to providing a moderate-risk visual indicator, based on identifying the fraud prediction satisfying (e.g., exceeding) a moderate-risk fraud prediction threshold, the intelligent fraud detection system 102 can execute other related actions, such as identifying and generating fraud predictions for other claims associated with an account (e.g., a same transaction-initiating account or transaction-recipient account). For example, the intelligent fraud detection system 102 can identify that an account (associated with a digital claim) submitted additional digital claims disputing network transactions. In some embodiments, the intelligent fraud detection system 102 can then suspend the account associated with the digital claim. In other embodiments, the intelligent fraud detection system 102 can provide a fraud-prediction label to the additional account, indicating that there is a possibility of fraud for the account.

As shown in FIG. 3, if the fraud prediction does not satisfy a high-risk or moderate-risk fraud prediction threshold, the intelligent fraud detection system 102 can determine that the fraud prediction does not satisfy (e.g., is lower than) a low-risk fraud prediction threshold and execute other related actions. For example, the intelligent fraud detection system 102 can perform an act 320 to provide a low-risk visual indicator denoting there is a low probability of fraud for the digital claim. In some embodiments, the intelligent fraud detection system 102 can provide a low-risk visual indicator by providing an indicator (e.g., a visual indicator) to a graphical user interface. For example, the intelligent fraud detection system 102 can provide the low-risk visual indicator in the form of a go-sign icon, a gauge icon with a pointer pointing to a low risk of fraud among different risk levels, a circular gauge with a colored ring indicating a low risk of fraud, a traffic-light icon, or other suitable graphical icon indicating a low risk of fraud—optionally along with a particular color as a color-coded graphic (e.g. a green-coded graphic). Additionally, or alternatively, the intelligent fraud detection system 102 can provide the low-risk visual indicator in the form of text (e.g., "Low Risk") with or without color coding (e.g., green text).

As previously mentioned, the intelligent fraud detection system 102 can take additional actions based on a fraud prediction not satisfying (e.g., is lower than) a low-risk fraud prediction threshold. Specifically, the intelligent fraud detection system 102 can perform an act 322 of issuing a credit to an account associated with the digital claim. For example, the intelligent fraud detection system 102 can provide a provisional credit to the account (e.g., a credit that the system still needs to approve fully). In other embodiments, the intelligent fraud detection system 102 or the inter-network facilitation system 104 can communicate with a bank system (e.g., the bank system 116) and provide a credit to an account associated with the bank system.

In other embodiments, the intelligent fraud detection system 102 or the inter-network facilitation system 104 can remove a credit. Specifically, in some embodiments, the intelligent fraud detection system 102 can identify additional features of the digital claim and generate an updated fraud prediction that then satisfies (e.g., exceeds) the low-risk fraud prediction threshold. Upon the fraud prediction satisfying the low-risk fraud prediction threshold (rather than not satisfying), the intelligent fraud detection system 102 can send instructions to remove a provisional credit from the inter-network facilitation system 104. In other embodiments, the intelligent fraud detection system 102 or the inter-network facilitation system 104 can send instructions to an external system (e.g., a bank system) to remove or cancel the provisional credit.

Figure 4A:
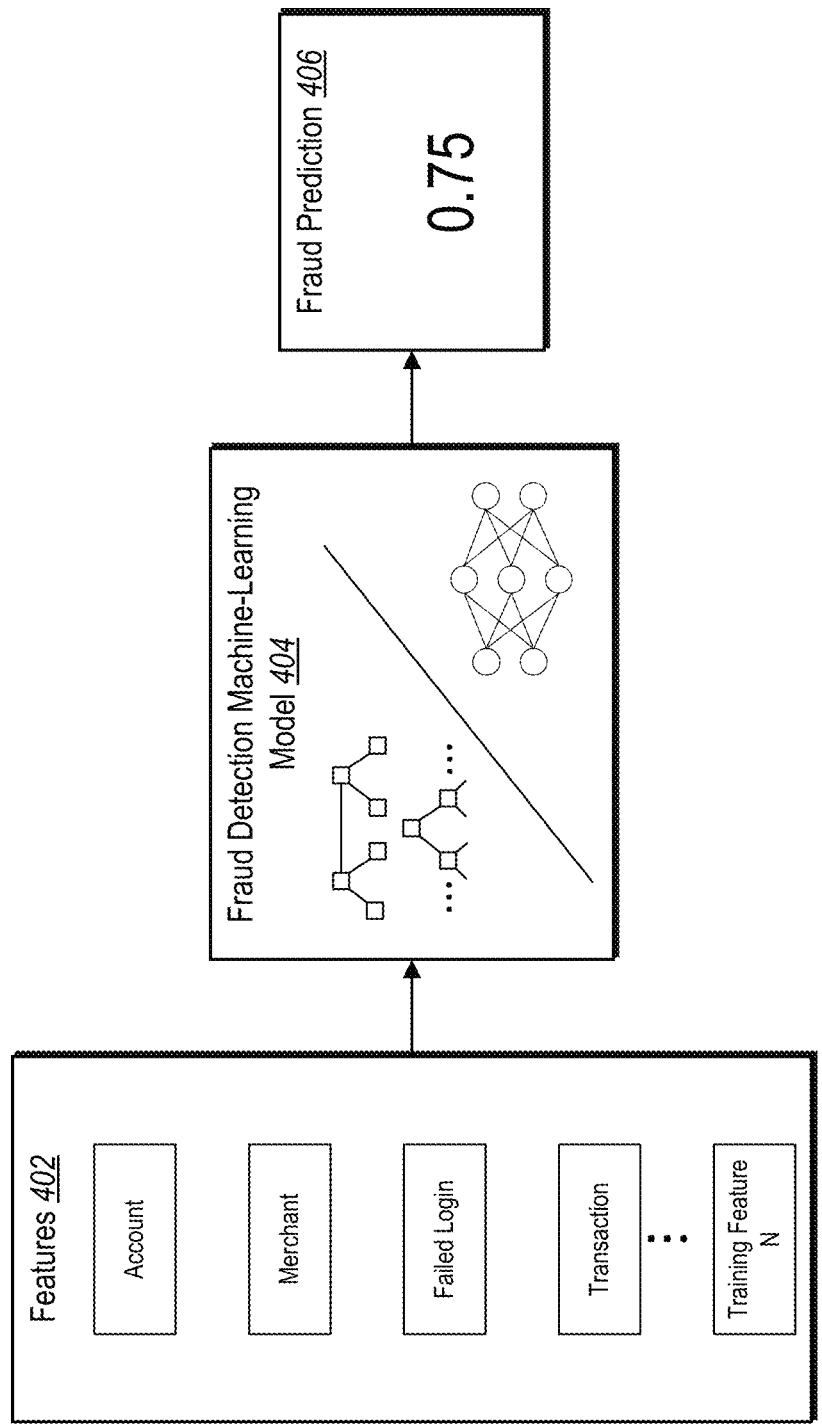
FIGS. 4A-4B illustrate the intelligent fraud detection system utilizing and training a fraud-detection machine learning model to generate fraud predictions for digital claims in accordance with one or more embodiments.
Figure 4B:
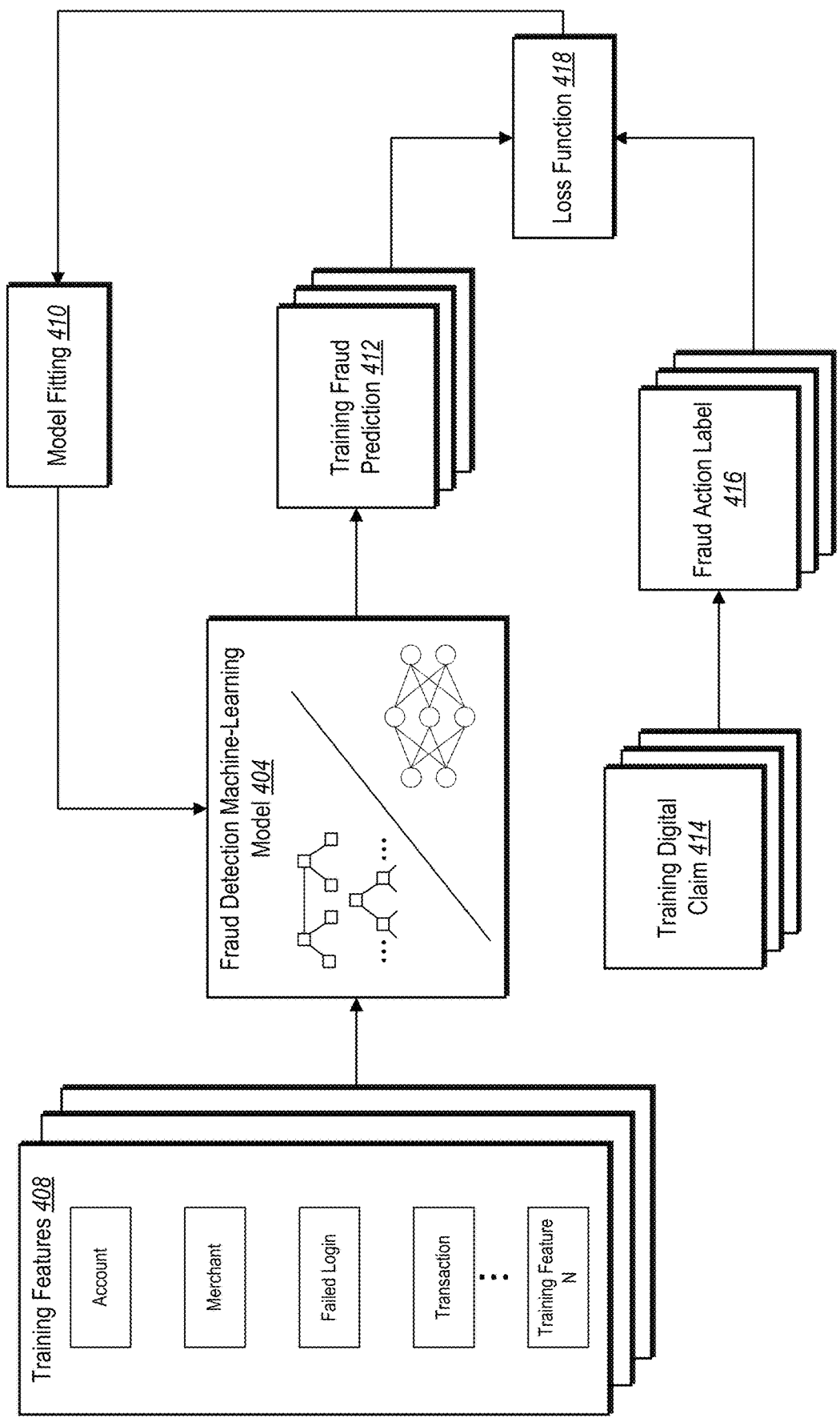

As mentioned above, in certain described embodiments, the intelligent fraud detection system 102 generates a fraud prediction by utilizing a fraud detection machine-learning model. FIGS. 4A-4B illustrate the intelligent fraud detection system 102 determining the fraud prediction in accordance with one or more embodiments. Specifically, FIG. 4A illustrates the intelligent fraud detection system 102 utilizing a fraud detection machine-learning model to determine a fraud prediction based on features identified by the intelligent fraud detection system 102, while FIG. 4B illustrates the intelligent fraud detection system 102 training the fraud detection machine-learning model.

As illustrated in FIG. 4A, the intelligent fraud detection system 102 identifies features associated with a digital claim. For example, the features identified could belong to one or more feature groups, such as features categorized as (i) an account feature, (ii) an automated-clearing-house feature, (iii) a computing device feature, (iv) a demand draft feature, (v) a transaction feature, (vi) a peer-to-peer-payment feature, (vii) an identity verification feature, (viii) a shared device feature, (ix) a shared-internet-protocol-address feature, (x) a customer-service-contact feature, (xi) a failed login feature, (xii) a password reset feature, (xiii) a personal identifiable-information-change feature, (xix) a linked-claim-dispute feature, (xv) a dispute history feature, or (xvi) a merchant feature.

In addition to identifying feature groups, the intelligent fraud detection system 102 can also identify individual features within each feature group. For instance, an account feature could take into individual features, such as account age, zip code associated with the account, time difference between enrollment and transaction, number of sessions, a number of linked member with closed accounts, or dormancy time. An automated-clearing-house feature group can include individual features, such as an average automated-clearing-house amount. A computing device feature can include individual features such as a number of internet-protocol-addresses used in a number of days, if the current device submitting a dispute and a device used in the last 12 or 24 hours are the same, or days between a first and last device seen. A demand draft feature can include individual features, such as an average dollar recurrent demand draft. A transaction feature can include individual features such as transaction amount, average transaction amount, number of payroll demand draws, number of transactions in a number of days, number of penny deposits, a number of dollar transactions in a number of days, or a time difference between the transaction and dispute. A peer-to-peer payment feature can include individual features such as a number of peer-to-peer transaction recipients. An identity verification feature can include individual features such as an email verification score. A shared device feature can include individual features such as a number of distinct device users in a number of days. A customer-service-contact feature can include individual features such as number of customer service disputes submitted in a number of days. A failed login feature can include individual features, such as number of failed logins in a number of days. A successful password reset feature can include individual features such as number of successful password resets in a number of days. A personal identifiable-information-change feature can include individual features, such as number of email resets in a number of days. A linked-claim-dispute feature can include individual features, such as a number of disputers linked through a device identification. A dispute history feature can include individual features, such as a number of submitted disputes in a last number of days (e.g., number of transactions in the previous day, 90 days or 365 days). More discussion with regard to ranking individual features will be discussed with regard to FIG. 6.

After identifying the features, intelligent fraud detection system 102 utilizes a fraud detection machine-learning model 404 to generate a fraud prediction 406 based on the identified features. Specifically, the fraud prediction 406 generates a fraud score or a fraud classification indicating a probability that the digital claim is fraudulent. In some cases, the fraud detection machine-learning model 404 is an ensemble of gradient boosted trees that process the features 402 to generate the fraud prediction 406. For instance, the fraud detection machine-learning model 404 includes a series of weak learners, such as non-linear decision trees, that are trained in a logistic regression to generate the fraud prediction 406. For example, the fraud detection machine-learning model generates the fraud prediction 406 as a fraud classification with a corresponding probability that the digital claim is fraudulent and/or a non-fraud classification with a corresponding probability that the digital claim is non-fraudulent.

In some cases, the fraud detection machine-learning model 404 is an ensemble of gradient boosted trees that processes the features 402 to generate the fraud prediction 406. In some cases, the fraud detection machine-learning model 404 includes metrics within various trees that define how the fraud prediction machine-learning model processes the features 402 to generate the fraud prediction 406. Additional detail regarding the training of the fraud detection machine-learning model 404 is provided below with reference to FIG. 4B.

In certain embodiments, the fraud detection machine-learning model 404 is a different type of machine-learning model, such as a neural network, a support vector machine, or a random forest. For example, in cases where the fraud detection machine-learning model 404 is a neural network, the fraud detection machine-learning model 404 includes one or more layers, each with neurons that make up the layer for processing the features 402. In some cases, the fraud detection machine-learning model 404 generates the fraud prediction 406 by extracting latent vectors from the features 402, passing the latent vectors from layer to layer (or neuron to neuron) to manipulate the vectors until utilizing an output layer (e.g., one or more fully connected layers) to generate the fraud prediction 406.

After identifying features and prior to utilizing the fraud detection machine-learning model 404, the intelligent fraud detection system 102 can preprocess the features. Specifically, the intelligent fraud detection system 102 can preprocess the features by imputing or replacing missing data with a median or mode of the feature. For example, the intelligent fraud detection system 102 can impute the median or mode by estimating values from a set of date, such as a training data set. In some cases, the intelligent fraud detection system 102 can impute the median of a feature by imputing the middle number value for a feature in a set of features sorted by value. In other cases, the intelligent fraud detection system 102 can impute the mean of a feature by imputing the most common value for a feature.

In addition to imputing the median or mode, the intelligent fraud detection system 102 can preprocess the features by utilizing target encoding to convert categorical data to numerical variables. For example, the intelligent fraud detection system 102 can utilize target encoding by replacing a categorical value with the mean of a target variable, where the mean is calculated from a distribution of target values for that particular level of categorical feature. Further, the intelligent fraud detection system 102 can place more or less importance on the average for the target values based on the size of the category. For example, if a feature category is small, the intelligent fraud detection 102 can determine can place less importance on the category by imputing a smaller average for the feature category.

As mentioned above, in certain embodiments, the intelligent fraud detection system 102 trains or tunes a fraud detection machine-learning model (e.g., the fraud detection machine-learning model 404). In particular, the intelligent fraud detection system 102 utilizes an iterative training process to fit a fraud detection machine-learning model by adjusting or adding decision trees or learning parameters that result in accurate fraud predictions (e.g., fraud prediction 406). FIG. 4B illustrates training a fraud prediction machine-learning model in accordance with one or more embodiments.

As illustrated in FIG. 4B, the intelligent fraud detection system 102 accesses a training digital claim 414. The training digital claim 414 constitutes a digital claim disputing one or more network transactions and is used to train the fraud detection machine-learning model 404. The training digital claim 414 has a corresponding fraud action label 416 associated with it, where the fraud action label 416 indicates whether the training digital claim 414 was previously determined to be either fraudulent or not fraudulent. For example, the training digital claim 414 could be a digital claim previously submitted that a team of researchers determined or confirmed as either fraudulent or not fraudulent. Accordingly, in some cases, the intelligent fraud detection system 102 treats the fraud action label 416 as a ground truth for training the fraud detection machine-learning model 404.

As further illustrated in FIG. 4B, the intelligent fraud detection system 102 provides training features 408 associated with the training digital claim 414 to the fraud detection machine-learning model 404 and utilizes the fraud detection machine-learning model 404 to generate a training fraud prediction 412 based on the training features 408. As the name indicates, the training features 408 represent features associated with a training digital claim 414 that are used for training the fraud detection machine-learning model 404. Accordingly, the training features 408 can constitute a feature from any of the feature groups or an individual features described herein. In some embodiments, the fraud detection machine-learning model 404 generates a set of training fraud predictions, including a predicted fraud classification with a corresponding probability that the training digital claim 414 is fraudulent and/or a non-fraud classification with a corresponding probability that the training digital claim 414 is non-fraudulent. The training fraud prediction 412 can according take the form of any of the fraud predictions described above.

As further illustrated in FIG. 4B, the intelligent fraud detection system utilizes a loss function to compare the training fraud prediction 412 and the fraud action label 416 (e.g., to determine an error or a measure of loss between them). For instance, in cases where the fraud detection machine-learning model 404 is an ensemble of gradient boosted trees, the intelligent fraud detection system 102 utilizes a mean squared error loss function (e.g., for regression) and/or a logarithmic loss function (e.g., for classification) as the loss function 418.

By contrast, in embodiments where the fraud detection machine-learning model 404 is a neural network, the intelligent fraud detection system can utilize a cross-entropy loss function, an L1 loss function, or a mean squared error loss function as the loss function 418. For example, the intelligent fraud detection system 102 utilizes the loss function 418 to determine a difference between the training fraud prediction 412 and the fraud action label 416.

As further illustrated in FIG. 4B, the intelligent fraud detection system performs model fitting 410. In particular, the intelligent fraud detection system 102 fits the fraud detection machine-learning model 404 based on loss from the loss function 418. For instance, the intelligent fraud detection system 102 performs modifications or adjustments to the fraud detection machine-learning model 404 to reduce the measure of loss from the loss function 418 for a subsequent training iteration.

For gradient boosted trees, for example, the intelligent fraud detection system 102 trains the fraud detection machine-learning model 404 on the gradients of errors determined by the loss function 418. For instance, the intelligent fraud detection system solves a convex optimization problem (e.g., of infinite dimensions) while regularizing the objective to avoid overfitting. In certain implementations, the intelligent fraud detection system 102 scales the gradients to emphasize corrections to under-represented classes (e.g., fraud classifications or non-fraud classifications).

In some embodiments, the intelligent fraud detection system 102 adds a new weak learner (e.g., a new boosted tree) to the fraud detection machine-learning model 404 for each successive training iteration as part of solving the optimization problem. For example, the intelligent fraud detection system 102 finds a feature that minimizes a loss from the loss function 418 and either adds the feature to the current iteration's tree or starts to build a new tree with the feature In addition to, or in the alternative, gradient boosted decision trees, the intelligent fraud detection system 102 trains a logistic regression to learn parameters for generating one or more fraud predictions, such as a fraud score indicating a probability of fraud. To avoid overfitting, the intelligent fraud detection system 102 further regularizes based on hyperparameters such as the learning rate, stochastic gradient boosting, the number of trees, the tree-depth(s), complexity penalization, and L1/L2 regularization In embodiments where the fraud detection machine-learning model 404 is a neural network, the intelligent fraud detection system 102 performs the model fitting 410 by modifying internal parameters (e.g., weights) of the fraud detection machine-learning model 404 to reduce the measure of loss for the loss function 418. Indeed, the intelligent fraud detection system 102 modifies how the fraud detection machine-learning model 404 analyzes and passes data between layers and neurons by modifying the internal network parameters. Thus, over multiple iterations, the intelligent fraud detection system 102 improves the accuracy of the fraud detection machine-learning model 404.

Indeed, in some cases the intelligent fraud detection system 102 repeats the training process illustrated in FIG. 4B for multiple iterations. For example, the intelligent fraud detection system 102 repeats the iterative training by selecting a new set of training features for each training digital claim along with a corresponding fraud action label. The intelligent fraud detection system 102 further generates a new set of training fraud predictions for each iteration. As described above, the intelligent fraud detection system 102 also compares a training fraud prediction at each iteration with the corresponding training action label and further performs model fitting 410. The intelligent fraud detection system 102 repeats this process until the fraud detection machine-learning model 404 generates training fraud predictions that result in fraud predictions that satisfy a threshold measure of loss.

As mentioned above, in some embodiments, the intelligent fraud detection system 102 provides a visual indicator of a fraud prediction for a digital claim for display within a graphical user interface. FIG. 5 illustrates the intelligent fraud detection system 102 providing, for display within a graphical user interface, a fraud prediction for a digital claim.

As shown in FIG. 5, the intelligent fraud detection system 102 provides, for display within a graphical user interface 504 on administrator device 502, a visual indicator that indicates the fraud prediction. In particular, the graphical user interface 504 comprises column 516 showing the various fraud predictions. For example, the graphical user interface 504 includes a high-risk visual indicator 518, a moderate-risk visual indicator 520, and a low-risk visual indicator 522.

As shown, in some embodiments, the high-risk visual indicator 518, the moderate-risk visual indicator 520, or the low-risk visual indicator 522 can include only text in the graphical user interface denoting the fraud risk. The text denoting the high-risk visual indicator 518, the moderate-risk visual indicator 520, or the low-risk visual indicator 522 can be colored differently based on the visual indicator (e.g., red for high-risk, yellow for moderate-risk, green for low-risk). In other embodiments, the high-risk visual indicator 518, the moderate-risk visual indicator 520, or the low-risk visual indicator 522 can be denoted with text and an image or icon denoting the fraud prediction. In other embodiments, the high-risk visual indicator 518, the moderate-risk visual indicator 520, or the low-risk visual indicator 522 can be denoted in the graphical user interface by only an image or icon denoting the fraud prediction, without accompanying text.

Additionally, in some cases, the high-risk visual indicator 518, the moderate-risk visual indicator 520, or the low-risk visual indicator 522 can be denoted in the cells of the graphical user interface (e.g., change the color of the cell based on the type of indicator). When denoting the high-risk visual indicator 518, the moderate-risk visual indicator 520, or the low-risk visual indicator 522 in the cells of the graphical user interface, the visual indicator can be based on indication in the cells or can also contain corresponding text or icons. Furthermore, the high-risk visual indicator 518, the moderate-risk visual indicator 520, or the low-risk visual indicator 522 can be denoted by a pop-up in the graphical user interface 504. For example, a pop-up can be a separate window that opens in the graphical user interface 504, an image or icon that opens near the fraud column 516, or other temporary notification denoting the high-risk visual indicator 518, the moderate-risk visual indicator 520, or the low-risk visual indicator 522. Moreover, the intelligent fraud detection system 102 can also rearrange column 516, so the fraud predictions are in descending order (e.g., high-risk, then moderate-risk, then low-risk).

As shown in FIG. 5, the graphical user interface 504 also includes column 506 denoting the claim number for the digital claim. Though labeled as a claim number, column 506 can contain any identifier for the digital claim, such as letters, numbers, a combination thereof, or an image. In addition, the graphical user interface contains column 508 denoting the transaction associated with the digital claim (e.g., the type of network transaction). As shown and described above, the network transaction can be a peer-to-peer transaction, an (allegedly) unauthorized transaction, or a refund request, among others. Furthermore, the graphical user interface can include column 510 denoting the account associated with the digital claim. The account can be an account associated with the inter-network facilitation system 104 or an external account, such as with a bank (e.g., bank system 116). Furthermore, the graphical user interface 504 includes column 512 denoting the amount of the digital claim. Moreover, in some embodiments, the graphical user interface includes column 514 denoting the recipient of a network transaction. For example, as shown, a peer-to-peer transaction includes the person to whom the $50 was transferred.

Figure 6:
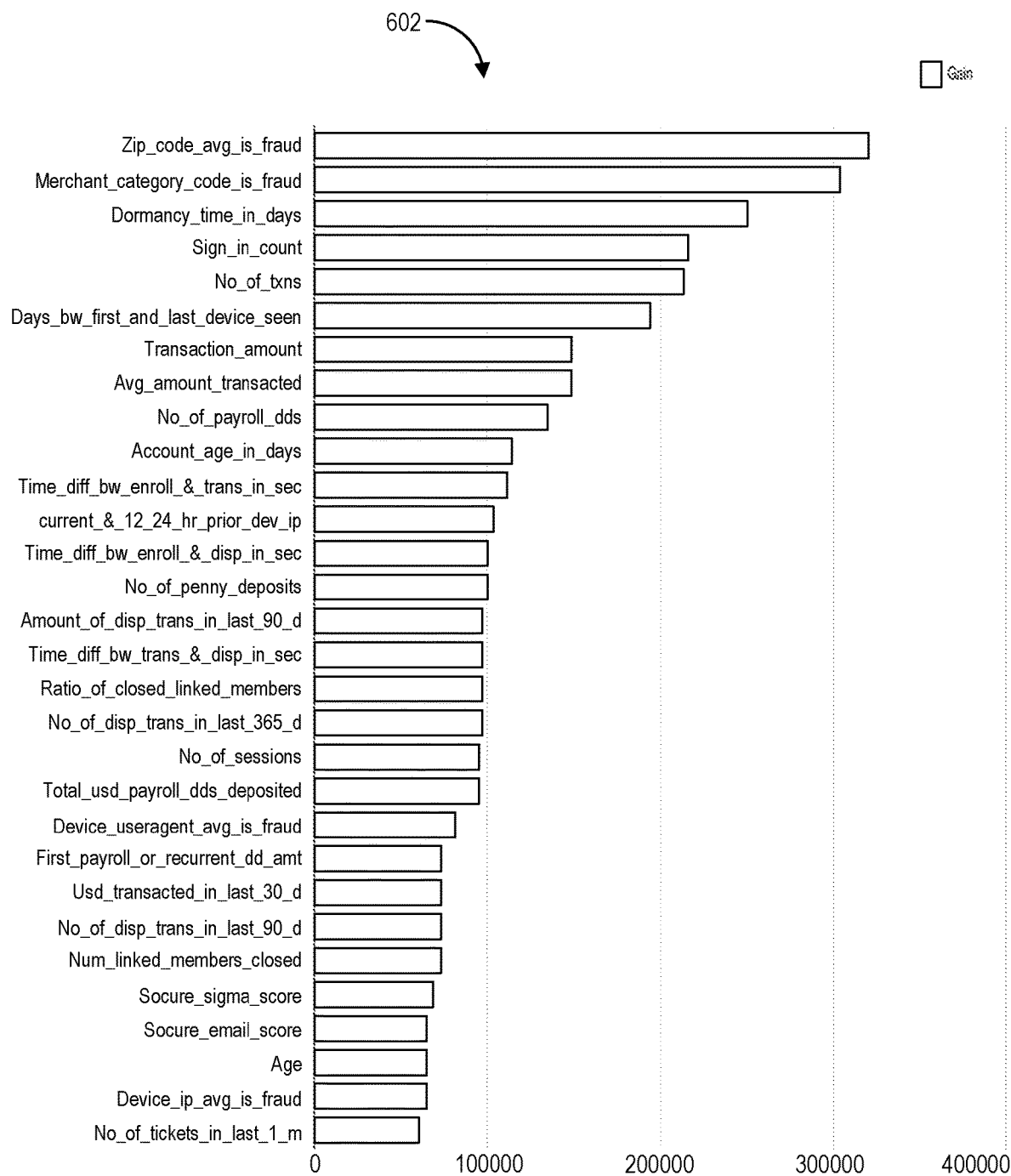
FIG. 6 illustrates a graph depicting an importance of various features for a fraud-detection machine-learning model in accordance with one or more embodiments.

As mentioned above, in some embodiments, the intelligent fraud detection system 102 identifies features associated with a digital claim. In particular, the intelligent fraud detection system 102 determines how impactful individual features are in determining a fraud prediction. FIG. 6 illustrates an example visualization of various features associated with a digital claim in accordance with one or more embodiments.

As illustrated in FIG. 6, the intelligent fraud detection system 102 determines the relative importance of features. For example, the intelligent fraud detection system 102 determines feature importance by running cross-validation on the dataset. Specifically, the intelligent fraud detection system 102 determines feature importance by running cross-validation across ten random cross-validation splits, and, as shown in FIG. 6, determines a gain for each feature, where the bar graph for each feature (roughly) indicates its importance. By evaluating the feature importance multiple times across the random splits, the result is a more reliable estimate of feature importance. Indeed, using a gradient boosted decision tree (or other decision tree) in this manner enables the system to identify and narrow down more important features to make for a more efficient machine-learning model that uses less memory and computer processing than other models.

As further shown in FIG. 6, the intelligent fraud detection system 102 can rank the features according to importance as well. For instance, the intelligent fraud detection system 102 determines that a zip code feature (e.g., the zip_code_avg_is_fraud) is highest among those displayed within the feature importance interface 602, followed by the merchant category code feature (e.g., the merchant_category_code_avg_is_fraud), a dormancy time in days feature (e.g., dormancy_time_in_days), a sign in count feature (e.g., the sign_in_count), a number of transactions feature (e.g., the no_of_txns) and so forth down the list.

Figure 7:
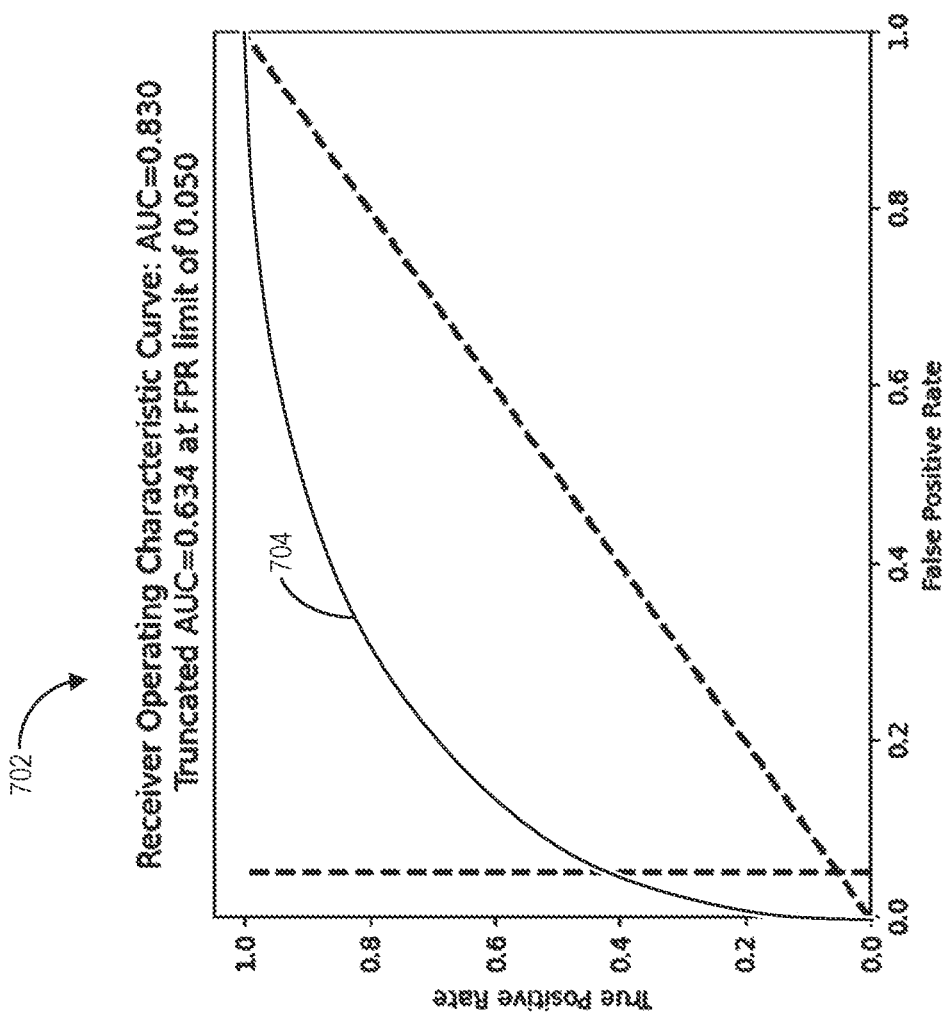
FIG. 7 illustrates a graph depicting true-positive rates and false-positive rates of the intelligent fraud detection system utilizing a fraud-detection machine learning model to detect fraudulent claims disputing one or more network transactions in accordance with one or more embodiments.

As mentioned above, the intelligent fraud detection system 102 improves in accuracy of detecting fraudulent digital claims over prior network-transaction-security systems. In particular, the intelligent fraud detection system 102 reduces false-positive fraud predictions and false-negative fraud predictions compared to prior network-transaction-security systems. FIG. 7 illustrates a graph depicting improvements in true positive and false positive rates for the intelligent fraud detection system 102 determining fraud predictions for digital claims utilizing a fraud-detection machine learning model in accordance with one or more embodiments As illustrated in FIG. 7, graph 702 includes a receiver operating characteristic (ROC) curve that illustrates reductions in fraud prediction false positives for the intelligent fraud detection system 102 as compared to without recalibrating via training fraud predictions by a fraud prediction machine-learning model. In particular, the graph 702 depicts an ROC curve 704 that depicts a true positive rate over a false positive rate with an area under the curve of 0.830. For the ROC curve 704, the true positive rate represents true-positive-fraudulent digital claims identified by the fraud prediction machine-learning model divided by the sum of true-positive-fraudulent digital claims and false-positive-fraudulent digital claims identified by the fraud prediction machine-learning model. By contrast, the false positive rate represents false-positive-fraudulent digital claims identified by the fraud prediction machine-learning model divided by the sum of true-positive-fraudulent digital claims and false-positive-fraudulent digital claims identified by the fraud prediction machine-learning model. As indicated by the graph 702, a truncated ROC curve demonstrates a 0.634 area under the curve for the intelligent fraud detection system 102 with the fraud prediction machine-learning model exhibits, thereby demonstrating an improvement in false positive fraud predictions over prior systems.

Figure 8:
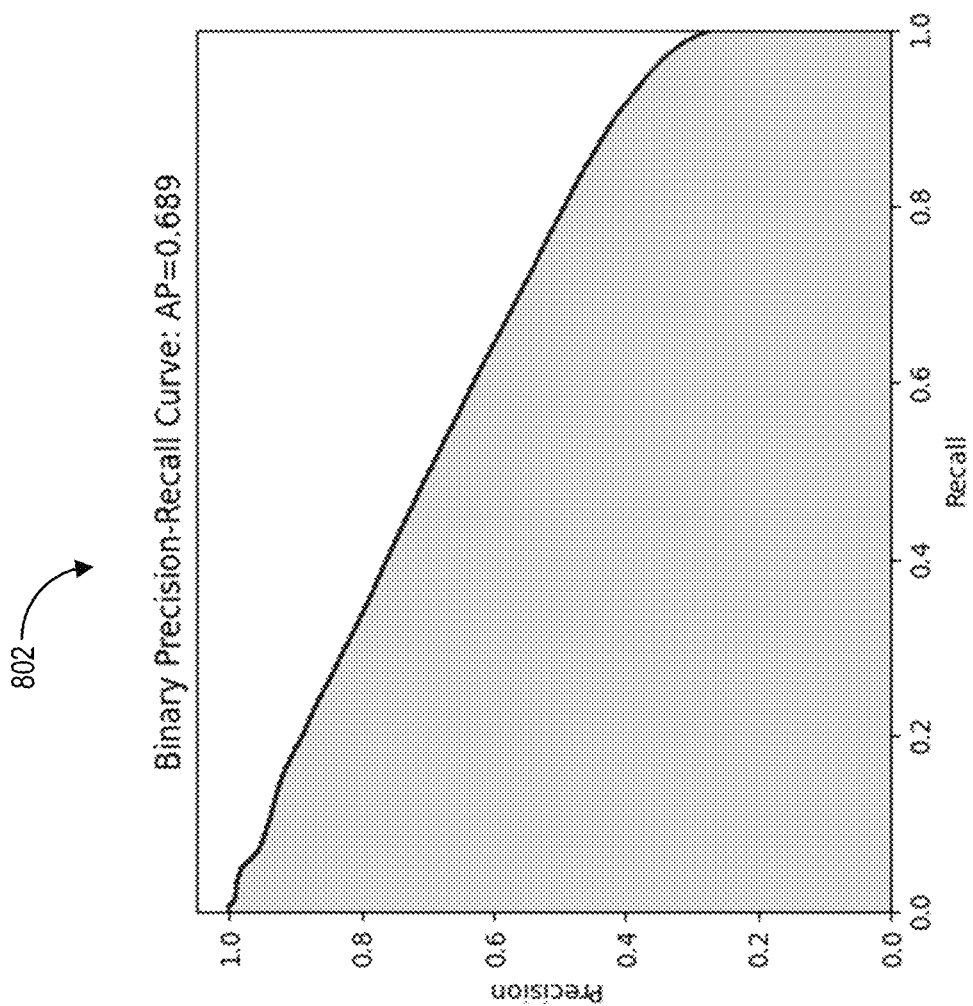
FIG. 8 illustrates a graph depicting the precision and recall of the fraud-detection machine learning model in accordance with one or more embodiments.

The intelligent fraud detection system 102 also improves in accurately identifying fraudulent digital claims over other systems. FIG. 8 illustrates a graph depicting the accuracy of the fraud-detection machine learning model in accordance with one or more embodiments.

As illustrated in FIG. 8, graph 802 includes a binary precision-recall curve that depicts precision over recall. In the graph 802, precision represents the number of true-positive-fraudulent digital claims divided by the sum of true-positive-fraudulent digital claims and false-positive-fraudulent digital claims. By contrast, recall represents the number of true-positive-fraudulent digital claims divided by the sum of true-positive-fraudulent digital claims and false-negative-fraudulent digital claims. As shown, the intelligent fraud detection system 102 utilizing the fraud prediction machine-learning model provides for an average precision of 0.689.

As depicted in FIG. 8, the intelligent fraud detection system 102 accurately identifies a large number of fraudulent digital claims at a low recall. For example, at an average of about ninety percent precision, recall is approximately twenty-five percent. Thus, for all submitted disputes, the intelligent fraud detection system 102 system accurately identifies approximately one quarter of all disputes as true-positive-fraudulent digital claims. Indeed, by accurately identifying a high number of true-positive-fraudulent digital claims, the intelligent fraud detection system 102 can take remedial actions (e.g., suspending a transaction or account) on fraudulent digital claims and limit the number of remedial actions on non-fraudulent digital claims.

Figure 9:
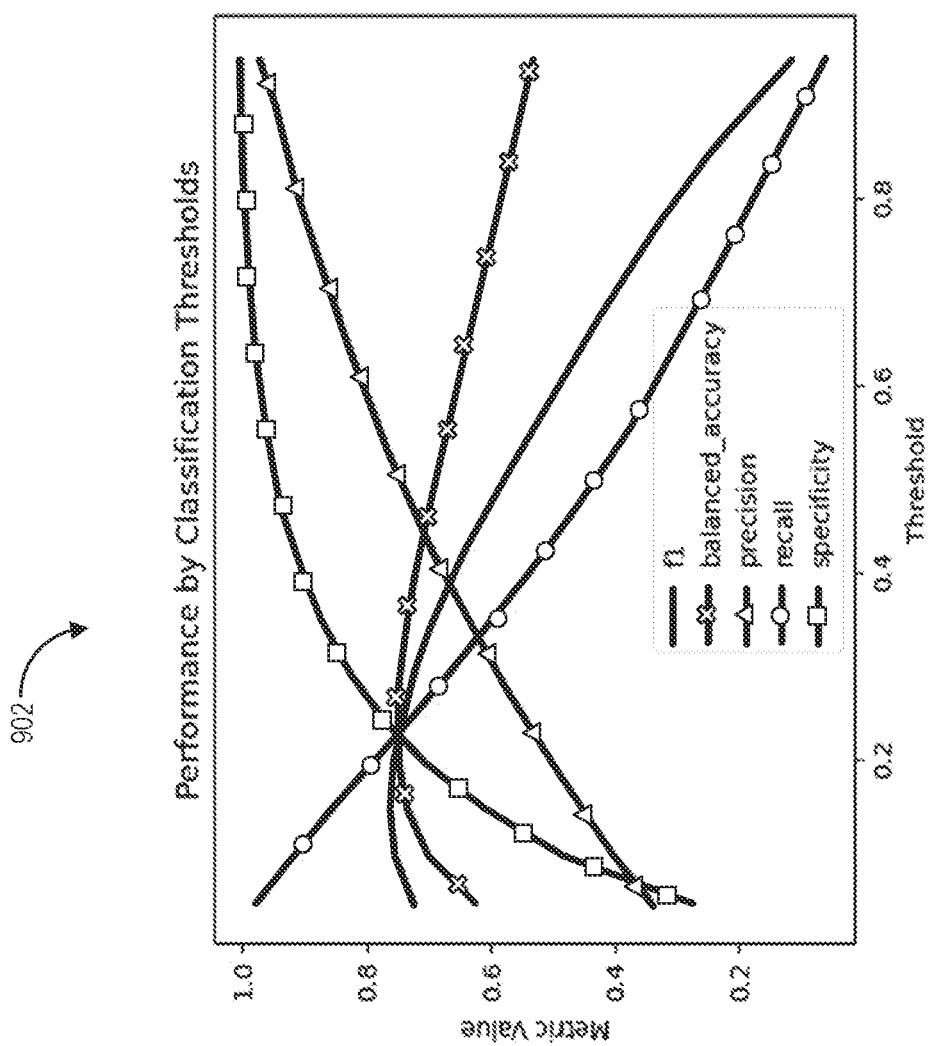
FIG. 9 illustrates a graph depicting precision, recall, specificity, and other metrics denoting the accuracy of the intelligent fraud detection system in accordance with one or more embodiments.

FIG. 9 illustrates graph 902 depicting various metrics denoting the accuracy of the intelligent fraud detection system 102 in accordance with one or more embodiments. In particular, the graph 902 depicts curves representing the values of various probability metrics over an increasing threshold value. For example, the graph 902 depicts a precision curve, wherein the precision represents the number of true-positive-fraudulent digital claims divided by the sum of true-positive-fraudulent digital claims and false-positive-fraudulent digital claims. The graph 902 also depicts a recall curve, wherein the recall (i.e., true positive rate) represents the number of true-positive-fraudulent digital claims divided by the sum of true-positive-fraudulent digital claims and false-negative-fraudulent digital claims. Additionally, the graph 902 depicts a specificity curve, wherein the specificity (i.e., true negative rate) represents the true-negative-fraudulent digital claims divided by the sum of the true-negative-fraudulent digital claims and the false-positive-fraudulent digital claims. Furthermore, the graph 902 depicts a balanced accuracy curve, wherein the balanced accuracy represents the average of the sensitivity (e.g., recall) and the specificity. The graph 902 also depicts an f1 curve, wherein the f1 represents the harmonic mean of the precision and recall.

As shown in FIG. 9, the intelligent fraud detection system 102 performs at a calibrated threshold that maximizes balanced accuracy. As depicted in FIG. 9, the point where the balanced accuracy is calibrated denotes where the intelligent fraud detection system 102 performs accurately with a high recall (i.e., where there are few false-negative-fraudulent digital claims) while also providing for an acceptable specificity. For example, the intersection point shown in FIG. 9 is where the f1 curve, balanced accuracy curve, recall curve and specificity curve intersect.

FIGS. 1-9, the corresponding text, and the examples provide a number of different systems, methods, and non-transitory computer readable media for generating a fraud prediction for a digital claim utilizing a fraud prediction machine-learning model. In addition to the foregoing, embodiments can also be described in terms of flowcharts comprising acts for accomplishing a particular result. For example, FIG. 10 illustrates a flowchart of an example sequence of acts in accordance with one or more embodiments.

Figure 10:
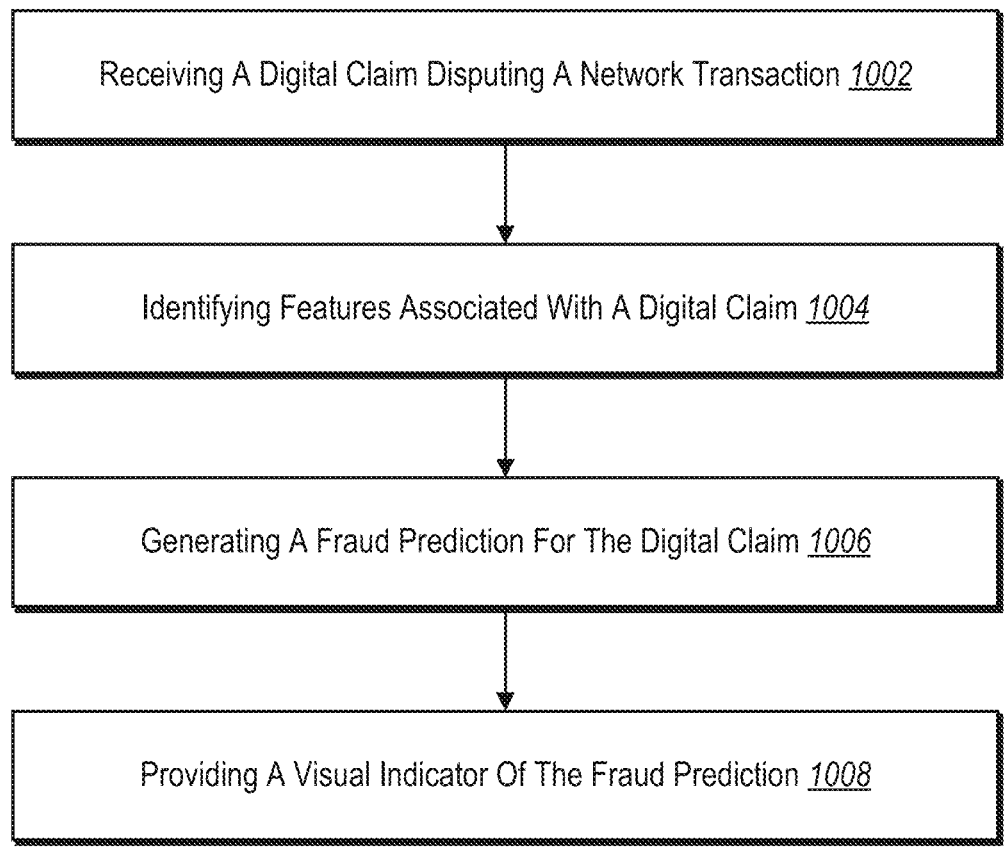
FIG. 10 illustrates an example series of acts for utilizing a fraud-detection machine learning model to generate a fraud prediction for a digital claim in accordance with one or more embodiments.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable storage medium can comprise instructions that, when executed by one or more processors, cause a computing device to perform the acts depicted in FIG. 10. In still further embodiments, a system comprising at least one processor and a non-transitory computer-readable medium comprising instructions that, when executed by one or more processors, cause the system to perform the acts of FIG. 10.

FIG. 10 illustrates an example series of acts 1000 for generating a fraud prediction for a digital claim utilizing a fraud detection machine-learning model. As shown in FIG. 10, the series of acts 1000 can include an act 1002 of receiving a digital claim. In particular, the act 1002 can involve receiving a digital claim disputing a network transaction.

Further, the series of acts 1000 includes an act 1004 of identifying features of associated with a digital claim. In particular, the act 1004 can involve identifying features of the digital claim by identifying at least one feature of the digital claim.

In addition, as illustrated in FIG. 10, the series of acts 1000 includes an act 1006 of generating a fraud prediction for the digital claim. In particular, the act 1006 involves generating, utilizing a fraud detection machine-learning model, a fraud prediction for the digital claim based on one or more features associated with the digital claim.

Furthermore, as shown in FIG. 10, the series of acts 1000 includes an act 1008 of providing a visual indicator of the fraud prediction for display. In particular, the act 1008 can involve providing, for display in a graphical user interface, a visual indicator of the fraud prediction for the digital claim.

In some embodiments, the series of acts 1000 includes an act of identifying features associated with the digital claim by determining one or more of an account feature, an automated-clearing-house feature, a computing device feature, a demand draft feature, a transaction feature, a peer-to-peer-payment feature, an identity verification feature, a shared device feature, a shared-internet-protocol-address feature, a customer-service-contact feature, a failed login feature, a password reset feature, a personal identifiable-information-change feature, a linked-claim-dispute feature, a dispute history feature, or a merchant feature. In some cases, identifying features associated with the digital claim can include determining one or more of a zip code feature, a merchant category code feature, an account dormancy time feature, a sign in feature, or a transaction-number feature.

The series of acts 1000 can include an act of determining that the fraud prediction satisfies a moderate-risk fraud prediction threshold and providing for display within in the graphical user interface a moderate-risk visual indicator of fraud for the digital claim.

In other embodiments, the series of acts 1000 can include determining that the fraud prediction satisfies a high-risk fraud prediction threshold and suspending the network transaction associated with the digital claim. Further, in other embodiments, the series of acts 1000 can include determining that the fraud prediction satisfies a high-risk fraud prediction threshold and, based on the fraud prediction satisfying the high-risk fraud prediction threshold, suspending an account associated with the digital claim. Additionally, the series of acts 1000 can include, after suspending the account associated with the digital claim, identifying an additional digital claim that is currently pending and disputing an additional network transaction associated with the account and, based on suspending the account and identifying the additional digital claim, providing, for display within the graphical user interface, an additional visual indicator of potential fraud for the additional digital claim.

Furthermore, in some embodiments, the series of acts 1000 can include determining that the fraud prediction satisfies a high-risk fraud prediction threshold, identifying a first account associated with the digital claim, identifying one or more features associated with the first account and a second account and, based on the one or more features of the first account and the second account, identifying the second account as associated with the first account, and based on determining that the fraud prediction satisfies a high-risk fraud prediction threshold and identifying the second account is associated with the first account, generating a fraud-propensity label for the second account. In addition, the series of acts 1000 can include displaying, within a graphical user interface, a visual fraud propensity indicator for the second account. In addition, the series of acts 1000 can include identifying the one or more features associated with the first account and the second account by determining one or more of: a peer-to-peer-payment feature, a shared device feature, or a shared-internet-protocol-address feature.

In some cases, the series of acts 1000 includes an act of determining that the fraud prediction does not satisfy a low-risk fraud prediction threshold and, based on the fraud prediction not satisfying a low-risk fraud prediction threshold, issuing a credit to an account associated with the network transaction or providing a low-risk visual indicator for the digital claim for display in the graphical user interface.

In other embodiments, the series of acts 1000 includes an act of determining that the digital claim disputes an additional network transaction, identifying one or more features associated with the digital claim disputing both the network transaction and the additional network transaction, and generating the fraud prediction by generating a fraud prediction for the digital claim disputing both the network transaction and the additional network transaction based on the one or more features associated with the digital claim.

In some embodiments, in the series of acts 1000 the fraud detection machine-learning model can be a gradient boosted decision tree. Furthermore, in certain embodiments, the series of acts 1000 can include identifying an account associated with the digital claim and determining that the digital claim and an additional digital claim disputing an additional network transaction are associated with the account. Further, the series of acts 1000 includes identifying one or more features associated with the additional digital claim and generating, utilizing the fraud detection machine-learning model, the fraud prediction by generating an aggregate fraud prediction for the digital claim and the additional digital claim based on the one or more features associated with the digital claim and the one or more features associated with the additional digital claim.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
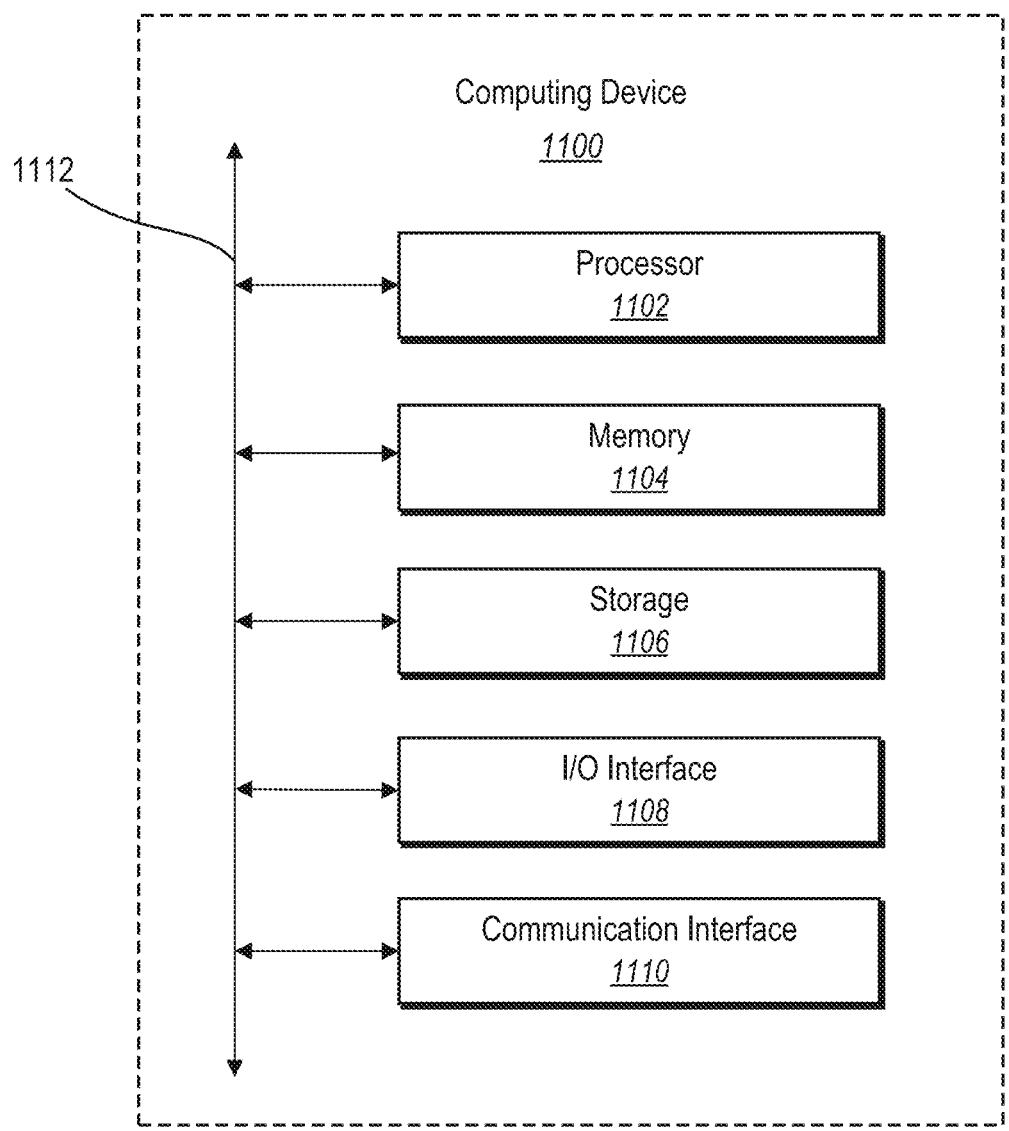
FIG. 11 illustrates a block diagram of a computing device for implementing one or more embodiments of the present disclosure.

FIG. 11 illustrates, in block diagram form, an exemplary computing device 1100 (e.g., the client device(s) 110*a*-110*n*, or the server(s) 106) that may be configured to perform one or more of the processes described above. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive ("HDD"), flash memory, a Universal Serial Bus ("USB") drive or a combination of these or other storage devices.

The computing device 1100 also includes one or more input or output interface 1108 (or "I/O interface 1108"), which are provided to allow a user (e.g., requester or provider) to provide input to (such as user strokes), receive output from, and otherwise transfer data to and from the computing device 1100. The I/O interface 1108 may include a mouse, keypad or a keyboard, a touch screen, camera, optical scanner, network interface, modem, other known I/O devices or a combination of such I/O interface 1108. The touch screen may be activated with a stylus or a finger.

The I/O interface 1108 may include one or more devices for presenting output to a user, including, but not limited to, a graphics engine, a display (e.g., a display screen), one or more output providers (e.g., display providers), one or more audio speakers, and one or more audio providers. In certain embodiments, interface 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can comprise hardware, software, or both that connects components of computing device 1100 to each other.

Figure 12:
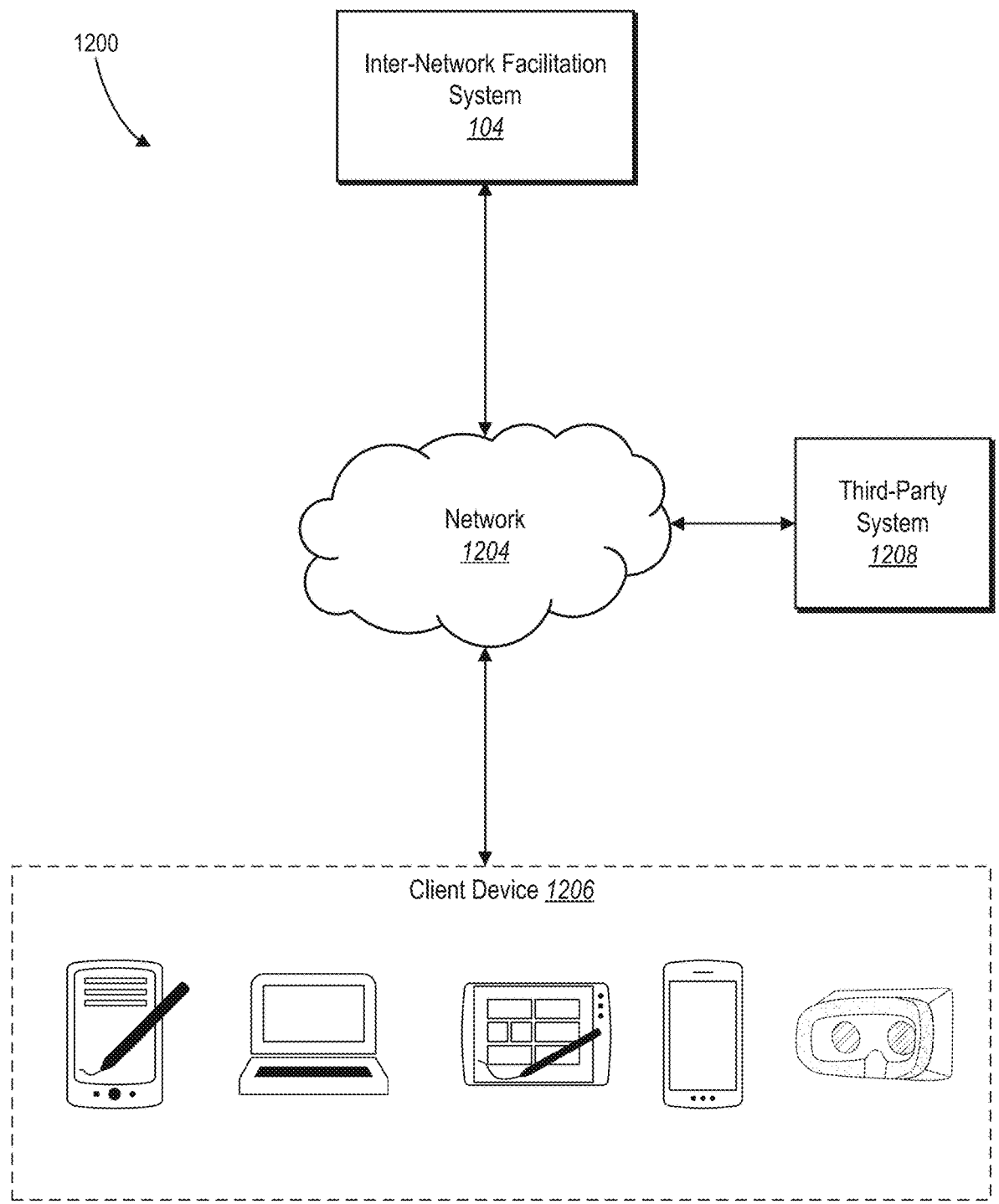
FIG. 12 illustrates an example environment for an inter-network facilitation system in accordance with one or more embodiments.

FIG. 12 illustrates an example network environment 1200 of the inter-network facilitation system 104. The network environment 1200 includes a client device 1206 (e.g., client device 110*a*-110*n*), an inter-network facilitation system 104, and a third-party system 1208 connected to each other by a network 1204. Although FIG. 12 illustrates a particular arrangement of the client device 1206, the inter-network facilitation system 104, the third-party system 1208, and the network 1204, this disclosure contemplates any suitable arrangement of client device 1206, the inter-network facilitation system 104, the third-party system 1208, and the network 1204. As an example, and not by way of limitation, two or more of client device 1206, the inter-network facilitation system 104, and the third-party system 1208 communicate directly, bypassing network 1204. As another example, two or more of client device 1206, the inter-network facilitation system 104, and the third-party system 1208 may be physically or logically co-located with each other in whole or in part.

Moreover, although FIG. 12 illustrates a particular number of client devices 1206, inter-network facilitation systems 104, third-party systems 1208, and networks 1204, this disclosure contemplates any suitable number of client devices 1206, inter-network facilitation system 104, third-party systems 1208, and networks 1204. As an example, and not by way of limitation, network environment 1200 may include multiple client device 1206, inter-network facilitation system 104, third-party systems 1208, and/or networks 1204.

This disclosure contemplates any suitable network 1204. As an example, and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, intelligent fraud detection system 102, and third-party system 1208 to network 1204 or to each other. This disclosure contemplates any suitable links. In particular embodiments, one or more links include one or more wireline (such as for example Digital Subscriber Line ("DSL") or Data Over Cable Service Interface Specification ("DOC SIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by client device 1206. As an example, and not by way of limitation, a client device 1206 may include any of the computing devices discussed above in relation to FIG. 11. A client device 1206 may enable a network user at the client device 1206 to access network 1204. A client device 1206 may enable its user to communicate with other users at other client devices 1206.

In particular embodiments, the client device 1206 may include a requester application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at the client device 1206 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1206 one or more Hyper Text Markup Language ("HTML") files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1204) to link the third-party-system 1208. For example, the inter-network facilitation system 104 may receive authentication credentials from a user to link a third-party system 1208 such as an online bank account, credit account, debit account, or other financial account to a user account within the inter-network facilitation system 104. The inter-network facilitation system 104 can subsequently communicate with the third-party system 1208 to detect or identify balances, transactions, withdrawal, transfers, deposits, credits, debits, or other transaction types associated with the third-party system 1208. The inter-network facilitation system 104 can further provide the aforementioned or other financial information associated with the third-party system 1208 for display via the client device 1206. In some cases, the inter-network facilitation system 104 links more than one third-party system 1208, receiving account information for accounts associated with each respective third-party system 1208 and performing operations or transactions between the different systems via authorized network connections.

In particular embodiments, the inter-network facilitation system 104 may interface between an online banking system and a credit processing system via the network 1204. For example, the inter-network facilitation system 104 can provide access to a bank account of a third-party system 1208 and linked to a user account within the inter-network facilitation system 104. Indeed, the inter-network facilitation system 104 can facilitate access to, and transactions to and from, the bank account of the third-party system 1208 via a client application of the inter-network facilitation system 104 on the client device 1206. The inter-network facilitation system 104 can also communicate with a credit processing system, an ATM system, and/or other financial systems (e.g., via the network 1204) to authorize and process credit charges to a credit account, perform ATM transactions, perform transfers (or other transactions) across accounts of different third-party systems 1208, and to present corresponding information via the client device 1206.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1208), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1200 either directly or via network 1204. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1204.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1206. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1206 associated with users.

In addition, the third-party system 1208 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1204. A third-party system 1208 can communicate with the inter-network facilitation system 104 to provide financial information pertaining to balances, transactions, and other information, whereupon the inter-network facilitation system 104 can provide corresponding information for display via the client device 1206. In particular embodiments, a third-party system 1208 communicates with the inter-network facilitation system 104 to update account balances, transaction histories, credit usage, and other internal information of the inter-network facilitation system 104 and/or the third-party system 1208 based on user interaction with the inter-network facilitation system 104 (e.g., via the client device 1206). Indeed, the inter-network facilitation system 104 can synchronize information across one or more third-party systems 1208 to reflect accurate account information (e.g., balances, transactions, etc.) across one or more networked systems, including instances where a transaction (e.g., a transfer) from one third-party system 1208 affects another third-party system 1208.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to:
   access a fraud detection machine-learning model that was trained using one or more training fraud predictions corresponding to training digital claims, wherein training the fraud detection machine-learning model comprises comparing a training digital claim to fraud action labels using a loss function to generate losses that are used to adjust one or more parameters of the fraud detection machine-learning model;
   receive, from a client device associated with a user account, a digital claim indicating that a network transaction associated with the user account was not authorized;
   identify one or more features associated with the digital claim;
   generate, as an output of the fraud detection machine-learning model, a fraud prediction indicating a probability that the digital claim is fraudulent by processing the one or more features associated with the digital claim with the fraud detection machine-learning model;

provide, for display in a graphical user interface, a visual indicator of the fraud prediction for the digital claim;

receive a fraud action label for the digital claim indicating whether the digital claim was fraudulent or not fraudulent; and update the one or more parameters of the fraud detection machine-learning model using the fraud action label by:

comparing the fraud action label to the fraud prediction and one or more additional fraud action labels to one or more additional fraud predictions;

determining, based on comparing the fraud action label to the fraud prediction and one or more additional fraud action labels to one or more fraud predictions, that the fraud prediction and the one or more additional fraud predictions do not satisfy a measure of loss; and updating parameters of the fraud detection machine-learning model.

2. The non-transitory computer-readable medium as recited in claim 1, further storing instructions thereon that, when executed by the at least one processor, cause the computing device to identify the one or more features associated with the digital claim by determining one or more of: an account feature, an automated-clearing-house feature, a computing device feature, a demand draft feature, a transaction feature, a peer-to-peer-payment feature, an identity verification feature, a shared device feature, a shared-internet-protocol-address feature, a customer-service-contact feature, a failed login feature, a password reset feature, a personal identifiable-information-change feature, a linked-claim-dispute feature, a dispute history feature, or a merchant feature.

3. The non-transitory computer-readable medium as recited in claim 1, further storing instructions thereon that, when executed by the at least one processor, cause the computing device to identify the one or more features associated with the digital claim by determining one or more of a zip code feature, a merchant category code feature, an account dormancy time feature, a sign in feature, or a transaction-number feature.

4. The non-transitory computer-readable medium as recited in claim 1, further storing instructions thereon that, when executed by the at least one processor, cause the computing device to:

determine that the fraud prediction satisfies a moderate-risk fraud prediction threshold; and based on determining that the fraud prediction satisfies the moderate-risk fraud prediction threshold, provide, for display within in the graphical user interface, the visual indicator by providing a moderate-risk visual indicator of fraud for the digital claim.

5. The non-transitory computer-readable medium as recited in claim 1, further storing instructions thereon that, when executed by the at least one processor, cause the computing device to:

determine that the fraud prediction satisfies a high-risk fraud prediction threshold; and based on the fraud prediction satisfying the high-risk fraud prediction threshold, suspend the network transaction or suspend an account associated with the digital claim.

6. The non-transitory computer-readable medium as recited in claim 1, further storing instructions thereon that, when executed by the at least one processor, cause the computing device to:

determine that the fraud prediction does not satisfy a low-risk fraud prediction threshold; and based on the fraud prediction not satisfying a low-risk fraud prediction threshold:

issue a credit to an account associated with the network transaction; or provide, for display in the graphical user interface, the visual indicator by providing a low-risk visual indicator for the digital claim.

7. The non-transitory computer-readable medium as recited in claim 1, further storing instructions thereon that, when executed by the at least one processor, cause the computing device to:

determine the digital claim indicates that an additional network transaction associated with the user account was not authorized;

identify one or more features associated with the digital claim disputing both the network transaction and the additional network transaction; and generate the fraud prediction by generating the fraud prediction for the digital claim disputing both the network transaction and the additional network transaction based on the one or more features associated with the digital claim.

8. The non-transitory computer-readable medium as recited in claim 1, wherein the fraud detection machine-learning model comprises a gradient boosted decision tree.

9. The non-transitory computer-readable medium as recited in claim 1, further storing instructions thereon that, when executed by the at least one processor, cause the computing device to:

determine that the fraud prediction satisfies a high-risk fraud prediction threshold;

based on the fraud prediction satisfying the high-risk fraud prediction threshold, suspend the user account;

identify an additional digital claim that is currently pending and indicates an additional network transaction associated with the user account was not authorized; and based on suspending the user account and identifying the additional digital claim, provide, for display within the graphical user interface, an additional visual indicator of potential fraud for the additional digital claim.

10. A system comprising:

at least one processor; and at least one non-transitory computer-readable medium storing instructions that, when executed by the at least one processor, cause the system to:

access a fraud detection machine-learning model that was trained using one or more training fraud predictions corresponding to training digital claims, wherein training the fraud detection machine-learning model comprises comparing a training digital claim to fraud action labels using a loss function to generate losses that are used to adjust one or more parameters of the fraud detection machine-learning model;

receive, from a client device associated with a user account, a digital claim indicating that a network transaction associated with the user account was not authorized;

identify one or more features associated with the digital claim;

generate, as an output of the fraud detection machine-learning model, a fraud prediction indicating a probability that the digital claim is fraudulent by processing the one or more features associated with the digital claim with the fraud detection machine-learning model;

provide, for display in a graphical user interface, a visual indicator of the fraud prediction for the digital claim;

receive a fraud action label indicating whether the digital claim was fraudulent or not fraudulent; and update the one or more parameters of the fraud detection machine-learning model using the fraud action label by:
- comparing the fraud action label to the fraud prediction and one or more additional fraud action labels to one or more additional fraud predictions;
- determining, based on comparing the fraud action label to the fraud prediction and one or more additional fraud action labels to one or more fraud predictions, that the fraud prediction and the one or more additional fraud predictions do not satisfy a measure of loss; and
- updating parameters of the fraud detection machine-learning model.

11. The system as recited in claim 10, further storing instructions thereon that, when executed by the at least one processor, cause the system to identify the one or more features associated with the digital claim by determining one or more of: an account feature, an automated-clearing-house feature, a computing device feature, a demand draft feature, a transaction feature, a peer-to-peer-payment feature, an identity verification feature, a shared device feature, a shared-internet-protocol-address feature, a customer-service-contact feature, a failed login feature, a password reset feature, a personal identifiable-information-change feature, a linked-claim-dispute feature, a dispute history feature, or a merchant feature.

12. The system as recited in claim 10, further storing instructions thereon that, when executed by the at least one processor, cause the system to identify the one or more features associated with the digital claim by determining one or more of: a zip code feature, a merchant category code feature, an account dormancy time feature, a sign in feature, or a transaction-number feature.

13. The system as recited in claim 10, further storing instructions thereon that, when executed by the at least one processor, cause the system to:
- determine that the fraud prediction satisfies a moderate-risk fraud prediction threshold; and
- based on determining that the fraud prediction satisfies the moderate-risk fraud prediction threshold, provide, for display within in the graphical user interface, the visual indicator by providing a moderate-risk visual indicator of fraud for the digital claim.

14. The system as recited in claim 10, further storing instructions thereon that, when executed by the at least one processor, cause the system to:
- determine that the fraud prediction satisfies a high-risk fraud prediction threshold;
- identify one or more features associated with the user account and an additional user account;
- based on the one or more features of the user account and the additional user account, identify the additional user account as associated with the user account; and
- based on determining that the fraud prediction satisfies a high-risk fraud prediction threshold and identifying the additional user account is associated with the user account, generate a fraud-prediction label for the additional user account.

15. The system as recited in claim 14, further storing instructions thereon that, when executed by the at least one processor, cause the system to provide, for display within the graphical user interface, a visual fraud propensity indicator for the additional user account.

16. The system as recited in claim 14, further storing instructions thereon that, when executed by the at least one processor, cause the system to identify the one or more features associated with the user account and the additional user account by determining one or more of: a peer-to-peer-payment feature, a shared device feature, or a shared-internet-protocol-address feature.

17. A method comprising:
accessing a fraud detection machine-learning model that was trained using one or more training fraud predictions corresponding to training digital claims, wherein training the fraud detection machine-learning model comprises comparing a training digital claim to fraud action labels using a loss function to generate losses that are used to adjust one or more parameters of the fraud detection machine-learning model;

receiving, from a client device associated with a user account, a digital claim indicating that a network transaction associated with the user account was not authorized;

identifying one or more features associated with the digital claim;

generating, as an output of the fraud detection machine-learning model, a fraud prediction indicating a probability that the digital claim is fraudulent by processing the one or more features associated with the digital claim with the fraud detection machine-learning model;

providing, for display in a graphical user interface, a visual indicator of the fraud prediction for the digital claim;

receiving a fraud action label indicating whether the digital claim was fraudulent or not fraudulent; and updating the one or more parameters of the fraud detection machine-learning model using the fraud action label by:
- comparing the fraud action label to the fraud prediction and one or more additional fraud action labels to one or more additional fraud predictions;
- determining, based on comparing the fraud action label to the fraud prediction and one or more additional fraud action labels to one or more fraud predictions, that the fraud prediction and the one or more additional fraud predictions do not satisfy a measure of loss; and
- updating parameters of the fraud detection machine-learning model.

18. The method as recited in claim 17, further comprising:
determining that the fraud prediction satisfies a high-risk fraud prediction threshold; and
based on the fraud prediction satisfying the high-risk fraud prediction threshold, suspending the network transaction or suspending an account associated with the digital claim.

19. The method as recited in claim 17, further comprising:
determining that the fraud prediction does not satisfy a low-risk fraud prediction threshold; and
based on the fraud prediction not satisfying a low-risk fraud prediction threshold:

issuing a credit to an account associated with the network transaction; or providing, for display in the graphical user interface, the visual indicator by providing a low-risk visual indicator for the digital claim.

20. The method as recited in claim 17, further comprising:

identifying an additional digital claim indicating that an additional network transaction associated with the user account was not authorized;

identifying one or more features associated with the additional digital claim; and generating, utilizing the fraud detection machine-learning model, the fraud prediction by generating an aggregate fraud prediction for the digital claim and the additional digital claim based on the one or more features associated with the digital claim and the one or more features associated with the additional digital claim.

* * * * *